United States Patent
Saitoh

(10) Patent No.: US 6,765,876 B2
(45) Date of Patent: *Jul. 20, 2004

(54) DEVICE FOR OUTPUTTING COMMUNICATION-LINE DATA TO TERMINAL

(75) Inventor: Tadashi Saitoh, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 185 days.

This patent is subject to a terminal disclaimer.

(21) Appl. No.: 10/021,090

(22) Filed: Dec. 19, 2001

(65) Prior Publication Data

US 2002/0048279 A1 Apr. 25, 2002

Related U.S. Application Data

(63) Continuation of application No. 09/060,349, filed on Apr. 15, 1998, now Pat. No. 6,363,054.

(30) Foreign Application Priority Data

Oct. 6, 1997 (JP) .............................................. 9-272863
Jan. 27, 1998 (JP) ............................................. 10-14387

(51) Int. Cl.[7] ........................... H04L 12/26; H04J 3/14; H04J 3/06
(52) U.S. Cl. ...................... 370/248; 370/412; 370/462; 370/503; 370/507
(58) Field of Search ................................ 370/248, 336, 370/351, 357, 358, 389, 431, 458, 474, 412, 462, 503, 507

(56) References Cited

U.S. PATENT DOCUMENTS

| | | | |
|---|---|---|---|
| 3,618,037 A | 11/1971 | Wollum | 340/172.5 |
| 4,542,507 A * | 9/1985 | Read | 370/248 |
| 4,821,180 A | 4/1989 | Gerety et al. | 364/200 |
| 5,373,504 A | 12/1994 | Tanaka et al. | 370/60.1 |
| 5,502,719 A * | 3/1996 | Grant et al. | 370/412 |
| 5,844,906 A * | 12/1998 | Khelghatti et al. | 370/474 |
| 5,999,543 A * | 12/1999 | Bortolini | 370/503 |
| 6,061,329 A | 5/2000 | Abe | 370/228 |
| 6,128,295 A * | 10/2000 | Larsson et al. | 370/389 |
| 6,363,054 B1 * | 3/2002 | Saitoh | 370/248 |
| 6,445,689 B2 * | 9/2002 | Bruenle | 370/336 |
| 6,466,577 B1 * | 10/2002 | Humblet et al. | 370/395 |

* cited by examiner

Primary Examiner—Man Phan
(74) Attorney, Agent, or Firm—Staas & Halsey LLP

(57) ABSTRACT

A device outputting a plurality of paths to a terminal after rearranging the plurality of paths when the paths are arranged in an order of free choice, the device having a counter which receives a path number of a path in response to first data about the path, and increments a count, starting from the path number, in response to additional data arriving and a storage unit, on a side of a communication line, shared by the plurality of paths, which stores real data of the path at positions indicated by the count, wherein the real data stored in the storage unit is output to the terminal.

29 Claims, 27 Drawing Sheets

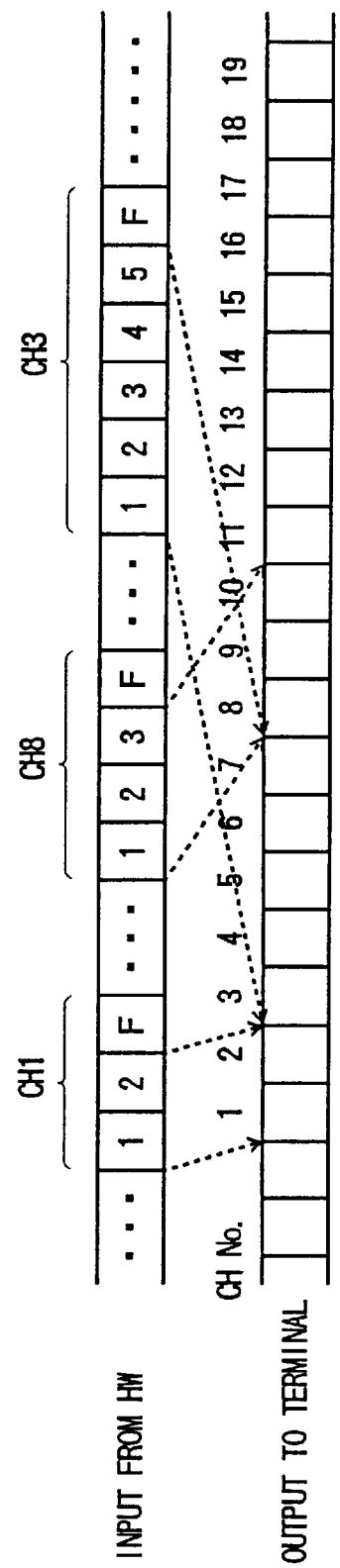

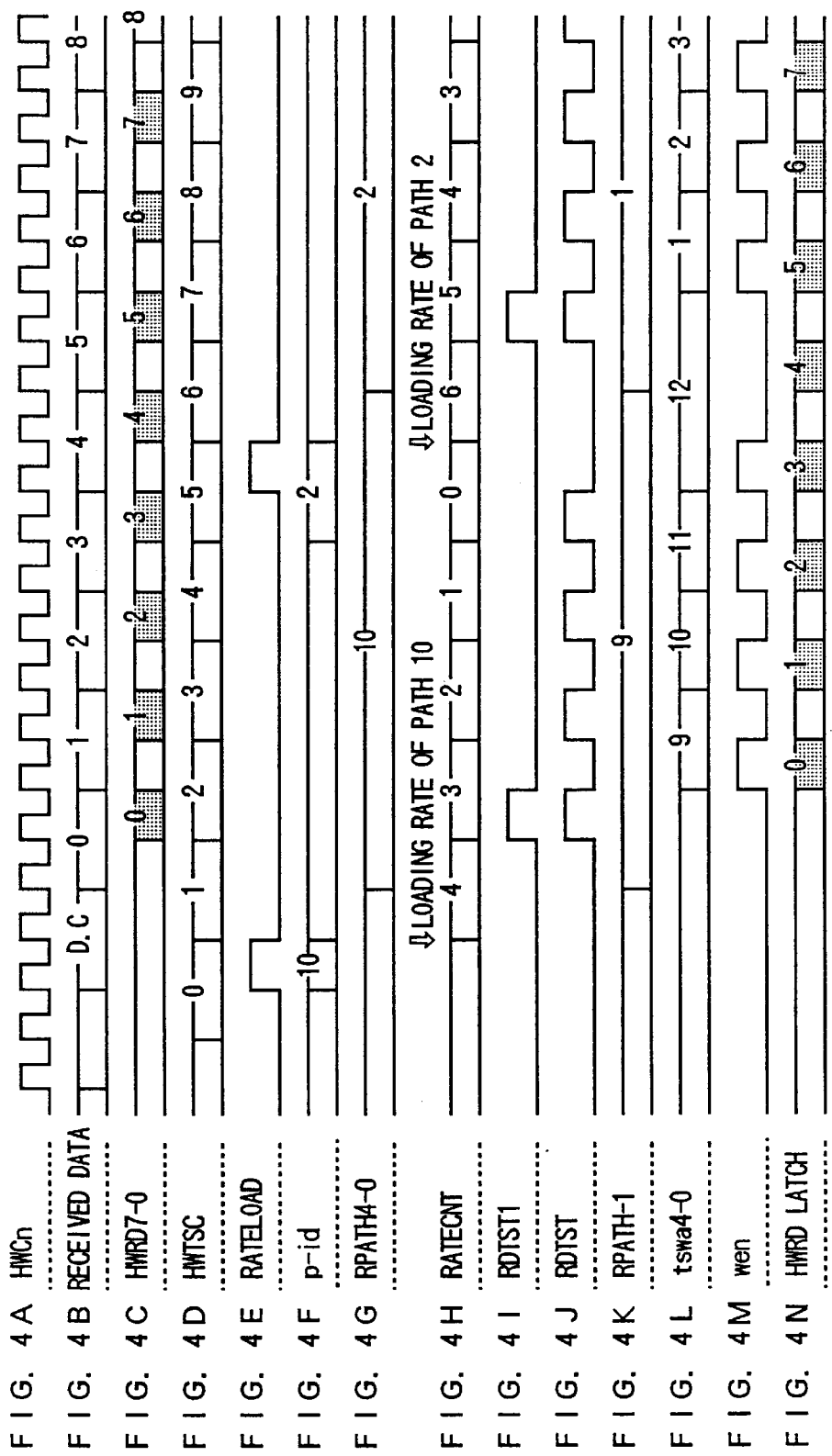

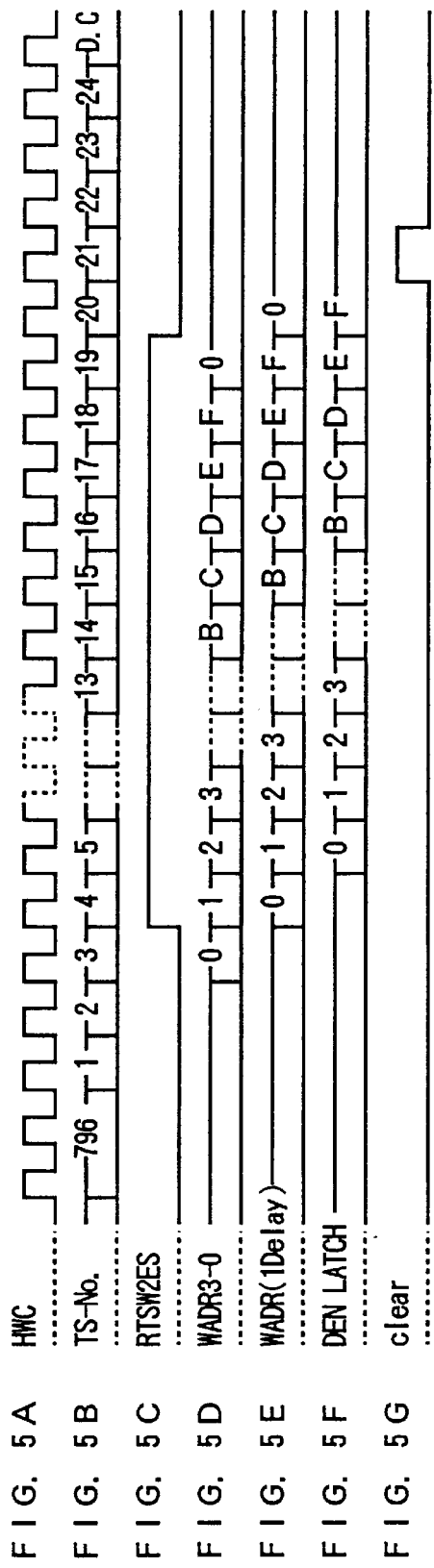

|   | b0 | b1 | b2 | b3 | b4 | b5 | b6 | b7 |
|---|---|---|---|---|---|---|---|---|
| 1 | F | 0 | S | X | X | X | X | X |
| 2 | F | 1 | S | A1 | A2 | A3 | A4 | A5 |
| 3 | F | 1 | S | A6 | A7 | A8 | A9 | A10 |
| 4 | F | 1 | S | A11 | A12 | A13 | A14 | A15 |
| 5 | F | 1 | S | A16 | A17 | A18 | A19 | A20 |
| 6 | F | 1 | S | A21 | A22 | A23 | A24 | A25 |
| 7 | F | 1 | S | A26 | A27 | A28 | A29 | A30 |
| 8 | F | 1 | S | X | X | X | X | X |

FIG. 10

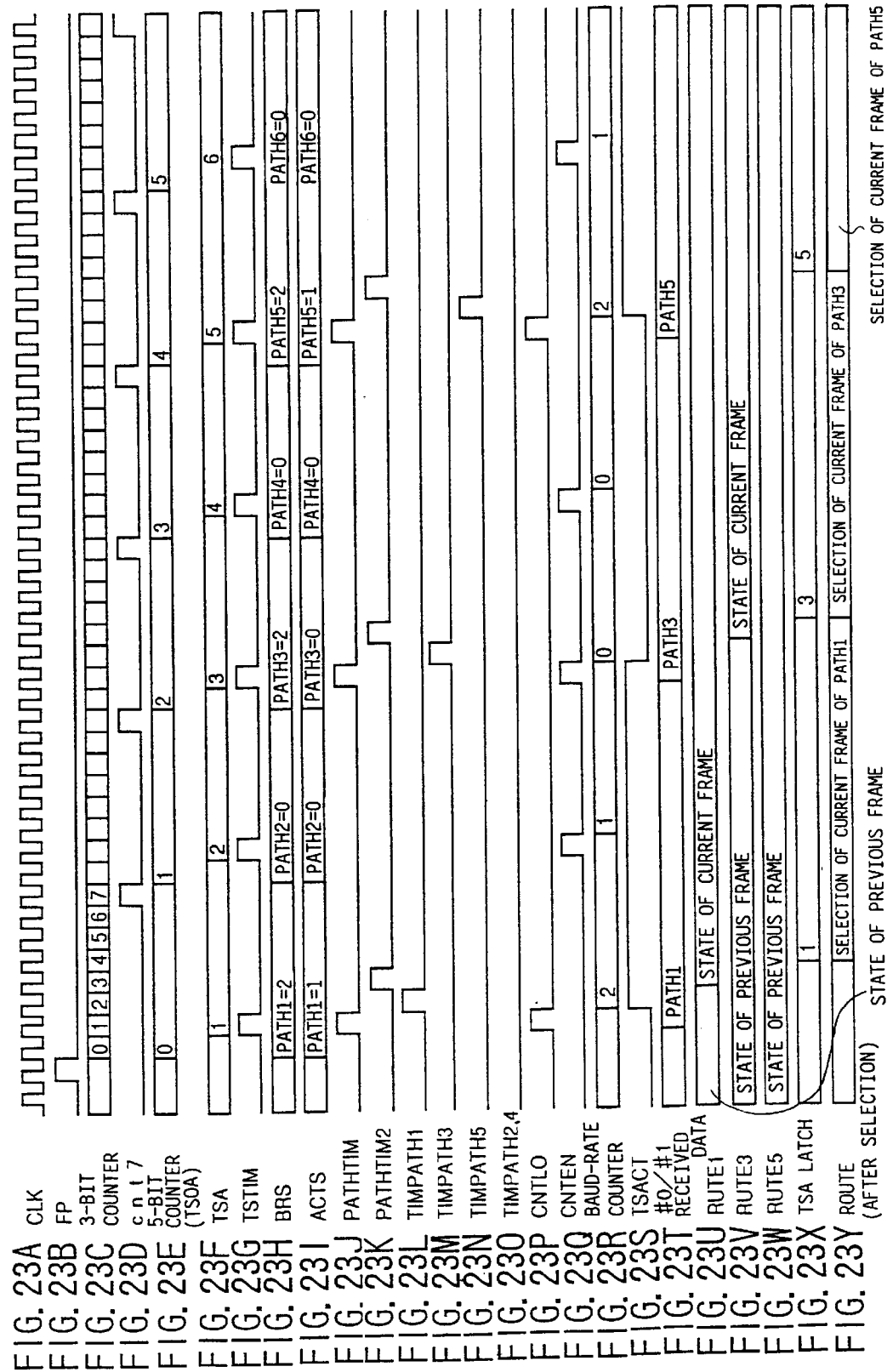

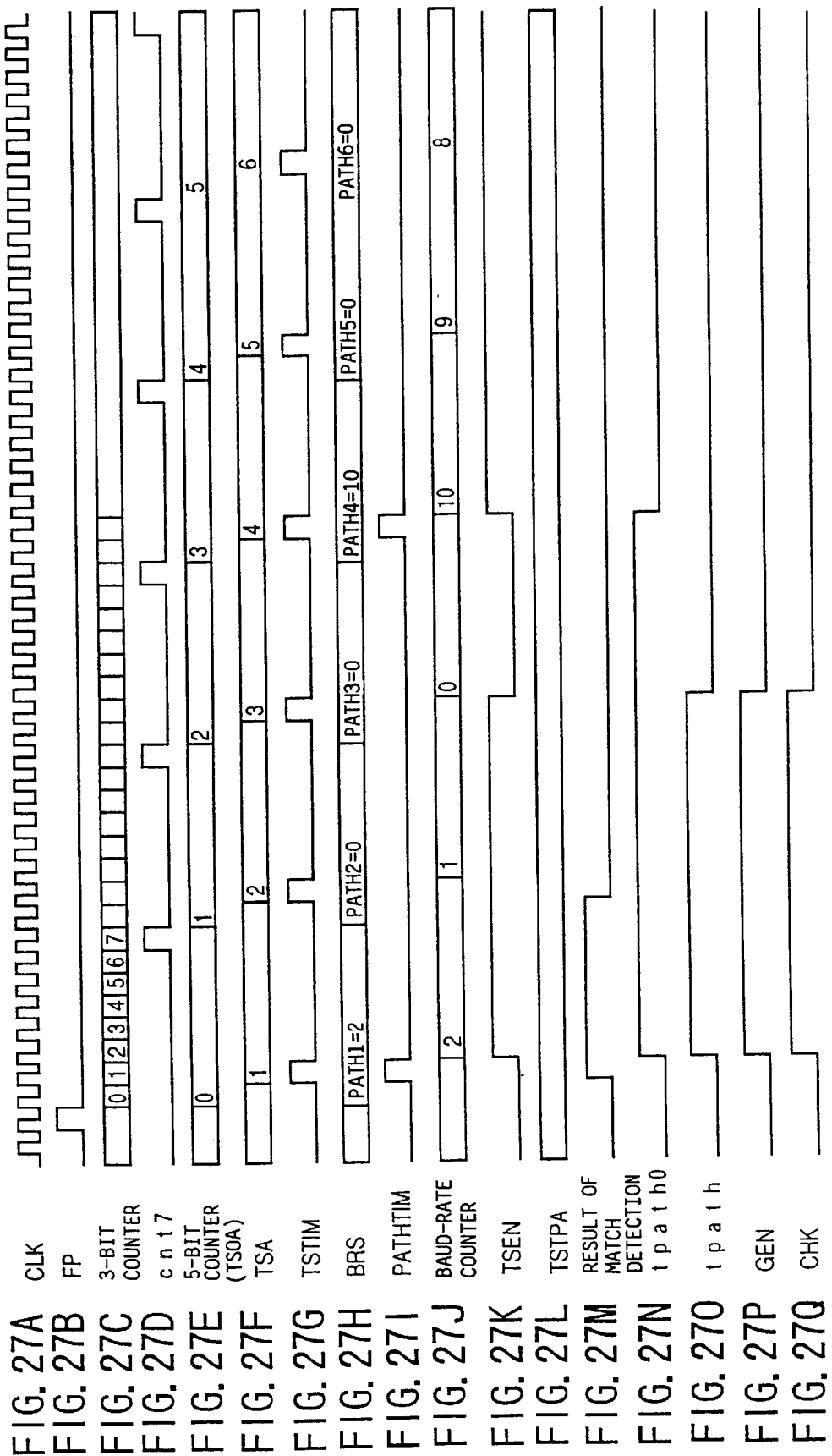

DEVICE FOR OUTPUTTING COMMUNICATION-LINE DATA TO TERMINAL

CROSS-REFERENCE TO RELATED APPLICATION

This application is a continuation of, and claims the priority of, U.S. patent application No. 09/060,349, now allowed, filed Apr. 15, 1998, now U.S. Pat. No. 6,363,054 the contents of which is incorporated by reference herein.

BACKGROUND OF THE INVENTION

1. Field of the Invention

The present invention generally relates to circuits for connecting communication lines with a terminal, and particularly relates to a circuit which connects communication lines with a terminal when a point-to-multipoint connection is established in a communication system such as a SDH-ring system.

2. Description of the Related Art

FIG. 1 is an illustrative drawing showing an example of an SDH-ring system. The SDH-ring system of FIG. 1 includes communication lines (SDH ring) 500, a plurality of LSIs 501, and a plurality of terminals 502 connected to the communication lines 500 via a corresponding one of the LSIs 501. The LSIs 501 receives data transmitted via the communication lines 500, and outputs the data to the terminals 502. The terminals 502 are devices such as a PBX, an ISDN-TD, or the like, to which a telephone, a TV set, etc., can be connected.

The simplest configuration to achieve a point-to-multipoint connection is to use a fixed communication baud rate in each of the terminals 502. In order to have simultaneous communication with as many terminals 502 as possible, the communication lines 500 must be provided with channels in the same number as the number of terminal channels defined by a terminal format.

In detail, a frame pulse XHFO/1 is used for indicating a start timing of each frame of communication data, and a HW (highway: communication line) clock HWC0/1 is used for establishing synchronization with a plurality of time slots contained in each frame. Each time slot is comprised of 8-bit data, and 32 time slots, for example, together make up one frame. In one frame, one or more time slots are put together to form a channel. When a communication slots. Each channel is called a path, and each path is used for communicating with a corresponding one of the terminals. Within one frame, an order of the path is not restricted but free to be set, and the order can be path 1, path 7, path 3, path 5, . . . , and so on, for example.

The start timing of each path on the side of the communication lines 500 is indicated by an offset number which is obtained by counting the number of pulses of HW clock HWC0/1 from the timing of the frame pulse XHFO/1. This offset number is stored in a register inside each LSI 501. In the case of a fixed communication baud rate, therefore, a fixed number of time slots starting from a timing indicated by the offset number are read from the communication lines 500, and are output to the terminal. Namely, when the communication baud rate is fixed to four time slots, for example, arrival of the path 1 results in writing data in addresses 0 through 3 of the output to the terminal, and the arrival of the path 3 leads to writing data in addresses 8 through 11. Such processing is conducted with regard to each path so as to output each path in a predetermined order to the terminal 502. In this case, the LSI 501 can be implemented by using a simple configuration.

When a communication baud rate is different for each path, however, the number of time slots varies for different paths. In this case, a simple process as described above is not applicable when paths arranged in an order of free choice on the side of the communication lines 500 need to be output to the terminal 502 in the order of path numbers. The communication baud rate (the number of time slots) of each path is stored in the register inside the LSI 501, as described above. The communication baud rate thus may be decoded with respect to each path so as to control a position of data writing, so that data of each path is written at an appropriate address position in the output to the terminal. Such a process, however, requires a complex and large circuit structure, resulting in an undesirable enlargement of a circuit size of the LSI 501.

Accordingly, there is a need for a small-scale circuit which can output data of paths to the terminal by using a simple process when the paths are provided in an order of free choice on the side of the communication lines in a system employing a point-to-multipoint connection and an adjustable communication baud rate.

SUMMARY OF THE INVENTION

Accordingly, it is a general object of the present invention to provide a small-scale circuit which can satisfy the need described above.

It is another and more specific object of the present invention to provide a small-scale circuit which can output data of paths to the terminal by using a simple process when the paths are provided in an order of free choice on the side of the communication lines in a system employing a point-to-multipoint connection and an adjustable communication baud rate.

In order to achieve the above objects according to the present invention, a device for outputting paths to a terminal after rearranging the paths when the paths are arranged in an order of free choice on a side of communication line includes a counter which receives a path number of a path in response to first data of the path, and counts up a count starting from the path number in response to second and following data of the path. The device further includes a storage unit which stores real data of the path at positions indicated by the count, wherein the real data stored in the storage unit is output to the terminal.

In the device described above, the real data of the path is written at positions controlled by the counter, so that terminal-side output is obtained such that the real data of path n holds an output position thereof in the n-th and following time slots. In this manner, a simple process and a simple circuit based on path numbers can rearrange communication-line data into terminal-side data.

According to one aspect of the present invention, the device further includes a data-enable circuit which holds 1 at positions therein indicated by the count when the real data is written at the positions indicated by the count in the storage unit, wherein the data-enable circuit holds zero at all positions therein at an initial state with respect to each frame.

In the device described above, the data "1" is set in the data-enable circuit so as to correspond, in terms of positions thereof, to the read data output to the terminal. In this manner, data for indicating a valid/invalid status of each time slot can be readily obtained with regard to the real data output to the terminal.

According to another aspect of the present invention, the device further includes a circuit which masks the real data output to the terminal by using data held in the data-enable circuit.

In the device described above, a valid/invalid status of each time slot can be found by using the data-enable circuit, so that invalid data can be masked so as not to be output.

According to another aspect of the present invention, the device further includes control-information-allocation circuit which receives control information allocated to the paths, and outputs the control information to the terminal in synchronism with the real data output to the terminal.

In the device described above, control information such as error information contained in paths can be output to the terminal in synchronism with the real data.

According to another aspect of the present invention, the control-information-allocation circuit includes a plurality of selectors which are connected in series such that one of the selectors receives as one of inputs thereof an output from a preceding one of the selectors.

In the device described above, the circuit comprised of the plurality of selectors can allocate the control information.

According to another aspect of the present invention, each of the plurality of selectors selects either the output from the preceding one of the selectors or the control information on a corresponding path, depending on whether a communication-data rate of the corresponding path is zero.

In the device described above, the circuit comprised of the plurality of selectors can allocate the control information by using the communication-data rate.

According to another aspect of the present invention, the device further includes a data-enable circuit which holds 1 at positions therein indicated by the count when the real data is written at the positions indicated by the count in the storage unit, wherein the data-enable circuit holds zero at all positions therein at an initial state with respect to each frame.

In the device described above, the data "1" is set in the data-enable circuit so as to correspond, in terms of positions thereof, to the read data output to the terminal. In this manner, data for indicating a valid/invalid status of each time slot can be readily obtained with regard to the real data output to the terminal.

According to another aspect of the present invention, the device further includes a circuit which masks the control information output to the terminal by using data held in the data-enable circuit.

In the device described above, a valid/invalid status of each time slot can be found by using the data-enable circuit, so that invalid data can be masked so as not to be output.

According to another aspect of the present invention, the device further includes a frame buffer which holds the real data for at least one frame period.

In the device described above, the frame buffer can hold an amount of the real data commensurate with one frame.

According to another aspect of the present invention, the device further includes a converting circuit which converts an output of the frame buffer from parallel data to serial data, the serial data being output to the terminal.

In the device described above, the parallel output from the frame buffer can be converted into the serial data before being output to the terminal.

According to another aspect of the present invention, a device is presented for outputting real data of paths to a terminal at terminal-output data positions corresponding to path numbers of the paths when receiving the paths arranged in an order of free choice on a side of communication line, and for outputting multiplexed signaling information contained in the paths in a form of multi-frames to the terminal. The device includes a write-signal-generation circuit which generates write signals with respect to each path by detecting synchronization of the multi-frames, a rotation shifter which performs a rotation shift of a predetermined number of signaling signals contained in each frame of the multi-frames in accordance with the path numbers, a write-signal-control circuit which selects at least one of the write signals in accordance with the path numbers, and a storage unit which stores outputs from the rotation shifter at positions indicated by the write signals selected by the write-signal-control circuit.

In the device described above, when the signaling signals are supplied in the form of multi-frames during the multiplexed signaling mode, the signaling signals can be output to the terminal so as to have positions thereof corresponding to those of the real data of each path which is also output to the terminal.

According to another aspect of the present invention, the rotation shifter performs a rotation shift of the predetermined number of signaling signals by {(a path number−1) %(the predetermined number)} bits.

In the device described above, the signaling signals can be allocated at appropriate positions in the storage unit.

According to another aspect of the present invention, the write-signal-control circuit comprises a plurality of selectors connected in series such that one of the selectors receives as one of inputs thereof an output from a preceding one of the selectors, each of the selectors having {(a corresponding path number−1)/(the predetermined number)+2} inputs.

In the device described above, the plurality of selectors connected in series such that one of the selectors receives as one of inputs thereof an output from a preceding one of the selectors is used for selecting the write signals, thereby allocating the signaling signals at appropriate positions in the storage unit.

According to another aspect of the present invention, each of the selectors comprises a 2-input selector and 3-input selectors provided in a total number of {(the corresponding path number−1)/(the predetermined number)+1}.

In the device describe above, the write-signal-control circuit can be implemented by using a 2 input selector and a plurality of 3-input selectors.

According to another aspect of the present invention, each of the selectors comprises 2-input selectors provided in a total number of {(the corresponding path number−1)/(the predetermined number)+1}.

In the device describe above, the write-signal-control circuit can be implemented by using a plurality of 2-input selectors.

According to another aspect of the present invention, the device further includes a register which sets mode information with respect to each path, the mode information indicating one of a normal signaling mode and a multiplexed signaling mode, and a selector which receiving the signaling signals corresponding to the multiplexed signaling mode as first inputs and the signaling signals contained in attached information of the paths corresponding to the normal signaling mode as second inputs, and selects one of the first inputs and the second inputs based on the mode information set in the register.

In the device described above, one of the multiplexed signaling mode and the normal signaling mode can be indicated with respect to each different path, so that the multiplexed signaling mode and the normal signaling mode are allowed to coexist.

According to another aspect of the present invention, the device further includes signal-allocation circuit which receives the signaling signals contained in the attached information, and outputs the signaling signals contained in the attached information to the terminal in synchronism with the real data output to the terminal.

In the device described above, the signaling signals contained in the attached information of the paths can be output to the terminal in synchronism with the real data.

According to another aspect of the present invention, the signal-allocation circuit comprises a plurality of selectors which are connected in series such that one of the selectors receives as one of inputs thereof an output from a preceding one of the selectors.

In the device described above, the circuit comprised of the plurality of selectors can allocate the signaling signals contained in the attached information.

According to another aspect of the present invention, each of the plurality of selectors selects either the output from the preceding one of the selectors or a signaling signal contained in the attached information of a corresponding path, depending on whether a communication-data rate of the corresponding path is zero.

In the device described above, the circuit comprised of the plurality of selectors can allocate the signaling signal(s) by using the communication-data rate.

According to another aspect of the present invention, the device further includes mode-information-allocation circuit which receives the mode information from the register, and outputs the mode information to the terminal in synchronism with the real data output to the terminal.

In the device described above, the mode information stored in the register with respect to each path can be output to the terminal in synchronism with the real data.

According to another aspect of the present invention, the mode-information-allocation circuit comprises a plurality of selectors which are connected in series such that one of the selectors receives as one of inputs thereof an output from a preceding one of the selectors.

In the device described above, the circuit comprised of the plurality of selectors can allocate the mode information.

According to another aspect of the present invention, each of the plurality of selectors selects either the output from the preceding one of the selectors or the mode information of a corresponding path, depending on whether a communication-data rate of the corresponding path is zero.

In the device described above, the circuit comprised of the plurality of selectors can allocate the mode information by using the communication-data rate.

Other objects and further features of the present invention will be apparent from the following detailed description when read in conjunction with the accompanying drawings.

BRIEF DESCRIPTION OF THE DRAWINGS

FIG. 2 is an illustrative drawing showing path allocation according to the principle of the present invention;

FIGS. 4A through 4N are timing charts showing operations of the HW-timing-control unit and the realdata-TSW unit;

FIGS. 5A through 5G are timing charts for explaining operations of a data-enable-buffer unit and a portion relevant thereto;

FIG. 10 is an illustrative drawing showing a configuration of a signaling multi-frame;

FIGS. 23A through 23Y are timing charts showing route-selection operations performed by the configurations of FIGS. 20A and 20B;

FIGS. 27A through 27Q are timing charts showing the test-insertion/check operations which are performed by the configurations of FIGS. 24A and 24B.

DESCRIPTION OF THE PREFERRED EMBODIMENTS

In the following, a principle and embodiments of the present invention will be described with reference to the accompanying drawings.

FIG. 2 is an illustrative drawing showing path allocation according to a principle of the present invention.

According to the present invention as shown in FIG. 2, a communication-line path n (i.e., CHn) is assigned to time slots starting from the n-th time slot in an output to a terminal regardless of a communication baud rate of the path n. In order to make this allocation viable, communication-line paths n+1 through n+m−1 are not used when the communication-line path n is comprised of real data equivalent to m time slots. When communication-line paths are structured in this manner, arrival of the path n including m time slots is dealt with simply by writing data to m time slots starting from the n-th time slot in the output to the terminal. This provides a simple process of outputting data of communication-line paths to the terminal in an order of path numbers.

In FIG. 2, F indicates attached information which is comprised of 8 bits to represent error-control information, etc., and time slots labeled by numbers represent real data.

Figure 3A:
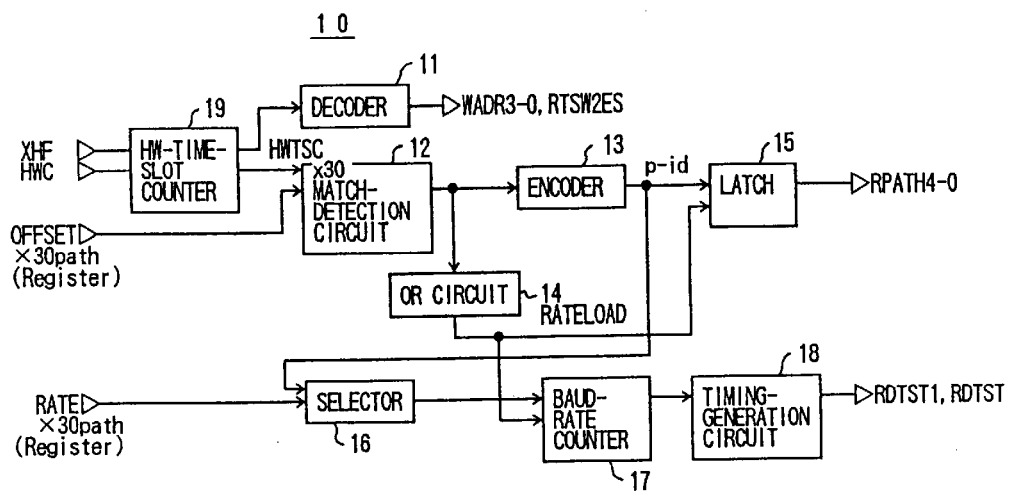
FIG. 3A is a block diagram of a HW-timing-control unit which generates signals for controlling a timing of communication-line data.
Figure 3B:
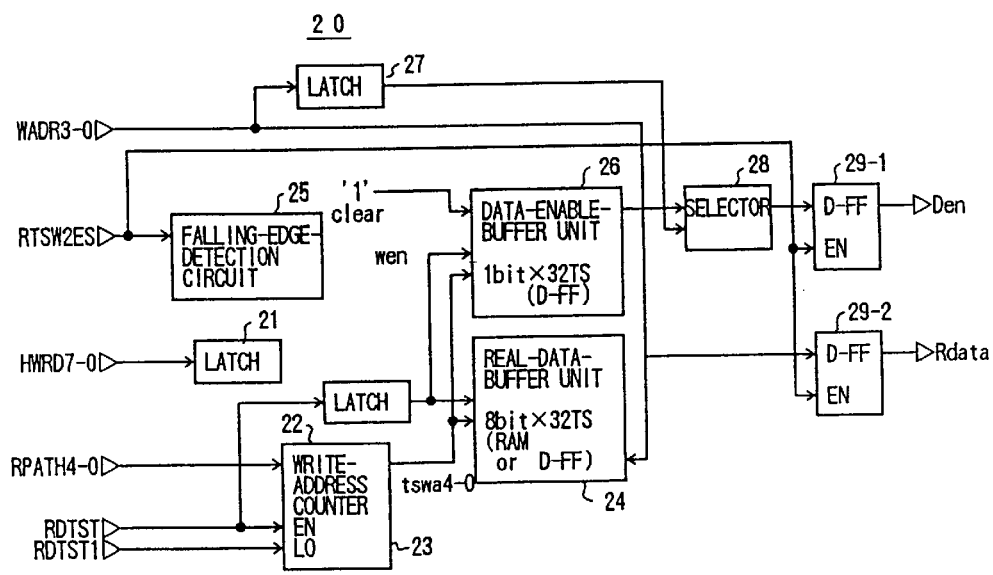
FIG. 3B is a block diagram of a real-data-TSW unit which converts input-communication data to terminal-output data based on signals from the HW-timing-control unit.

FIG. 3A is a block diagram of a HW-timing-control unit 10 which generates signals for controlling a timing of communication-line data. FIG. 3B is a block diagram of a real-data-TSW unit 20 which converts input-communication data to terminal-output data based on the signals from the HW-timing-control unit 10.

The HW-timing-control unit 10 of FIG. 3A includes a decoder 11, a match-detection circuit 12, an encoder 13, an OR circuit 14, a latch 15, a selector 16, a baud-rate counter 17, a timing-generation circuit 18, and a HW-time-slot counter 19.

The HW-time-slot counter 19 receives a frame pulse XHF and a HW clock HWC, and counts pulses of the HW clock HWC by starting from the frame pulse XHF. The count number is decoded by the decoder 11 to generate a read-address signal WADR3-0 and a read-timing signal RTSW2ES. Details of these signals will be described later. In FIGS. 3A and 3B and hereinafter, the symbol "n-0" following a signal name indicates that this signal is parallel data comprised n+1 bits from bit 0 to bit n. (For example, WADR3-0 is parallel data comprised of 4 bits.) By the same token, the symbol "n-1" means that the pertinent signal is parallel data comprised of n bits from bit 1 to bit n.

The count number (HWTSC) of the HW-time-slot counter 19 is supplied to the match-detection circuit 12, where it is compared with an offset OFFSET stored in a register. The offset OFFSET indicates a start timing of each path relative to the frame pulse XHF by using a count of pulses of the HW clock HWC, and is provided for each of 30 paths. The match-detection circuit 12 makes a comparison with regard to the 30 paths, and outputs data comprised of 30 bits. This output data has a bit of "1" at a bit position corresponding to a path number when the offset OFFSET of this path number matches the count number. Namely, this bit position of "1" indicates a path number of a path which starts at a position inside a current frame indicated by a current pulse of the HW clock HWC.

The output data from the match-detection circuit 12 is encoded by the encoder 13, and is stored in the latch 15 as a path ID p-id. The OR circuit 14 executes an OR operation with respect to all bits of the output data from the match-detection circuit 12, and changes an output (RATELOAD) thereof to HIGH when at least one of these bits is HIGH. The latch 15 performs a latch operation in response to the output of the OR circuit 14. Namely, data RPATH4-0 stored in the latch 15 indicates a path number of a path which is present at a inside-frame position indicated by the current pulse of the HW clock HWC.

The path ID p-id is input to the selector 16. The selector 16 selects one of the data rates RATE corresponding to 30 respective paths stored in the register, such that the selected one of the data rates RATE corresponds to the path ID p-id. The selected one of the data rates RATE is supplied to the baud-rate counter 17. The baud-rate counter 17 reads the data rate of the path ID p-id at a timing indicated by the output of the OR circuit 14, and, then, counts down the received data rate to output the count. The timing-generation circuit 18 decodes the count, and outputs a path-start signal RDTST1 and a slot-counter signal RDTST. The path-start signal RDTST1 becomes HIGH at a start timing of a given path, and the slot-counter signal RDTST is comprised of the same number of pulses as the number of data slots of this path.

Each signal output from the HW-timing-control unit 10 of FIG. 3A is supplied to the real-data-TSW unit 20 of FIG. 3B.

The real-data-TSW unit 20 includes a latch 21, a latch 22, a write-address counter 23, a real-data-buffer unit 24, a falling-edge-detection circuit 25, a data-enable-buffer unit 26, a latch 27, a selector 28, and D-FFs 29-1 and 29-2.

The latch 21 latches input-communication data HWRD7-0 which is 8-bit data corresponding to a single time slot, and supplies same to the real-data-buffer unit 24. The real-data-buffer unit 24 is comprised of a RAM, for example, and stores the input-communication data HWRD7-0 at an indicated address. This address is controlled in order to generate the terminal-output data shown in FIG. 2.

The address is generated by the write-address counter 23. The write-address counter 23 reads a path number RPATH4-0 in response to the path-start signal RDTST1, and counts up the path number in synchronism with the slot-counter signal RDTST. Actually, the path number is first subtracted by one, and is counted up by using the slot-counter signal RDTST. Subtraction by one is necessary because addresses of the real-data-buffer unit 24 start from 0 rather than 1, so that the path number minus one is actually a start address at which the path should be written. The write-address counter 23 supplies the count number to the real-data-buffer unit 24 as a write address tawa4-0. The slot-counter signal RDTST is delayed by the latch 22, and, then, is supplied to the real-data-buffer unit 24 as a write-enable signal wen.

In this manner, the m time slots of the path n on the side of the communication lines are written at addresses n-1 to n−1+m−1 in the real-data-buffer unit 24.

FIGS. 4A through 4N are timing charts showing operations of the HW-timing-control unit 10 and the real-data-TSW unit 20 described above. In the figures, a signal RATECNT indicates a count number of the baud rate counter 17 shown in FIG. 3A. Other signals have been already described in the above description.

According to the principle of the present invention shown in FIG. 2, the terminal-output data is generated as described above to output communication-line paths to the terminal in an order of path numbers. Elements of FIG. 3B which have not been described are those which become necessary in a practical system implementation, and will be described below.

The terminal-output data stored in the real-data-buffer unit 24 is read two time slots by two time slots by using the read-address signal WADR3-0, and is stored in the D-FF 29-2. The latch timing of the D-FF 29-2 is defined by the read-timing signal RTSW2ES. The output of the D-FF 29-2 is terminal-output data Rdata.

The data-enable-buffer unit 26 is a register which indicates a valid/invalid status of the terminal-output data. All bits of the terminal-output data do not have valid data written therein. Some bits include invalid data. In order to indicate a valid/invalid status of these bits, the data-enable-buffer unit 26 assign "1" to bits when real data is written in corresponding addresses (time slot positions), and assign "0" to other bits. This is achieved by supplying the write address tswa4-0 from the write-address counter 23 and the write-enable signal wen from the latch 22 to the data-enable-buffer unit 26 so as to write "1" at the write address tswa4-0. Here, the data-enable-buffer unit 26 stores "0" in all bits thereof at an initial state.

To ensure that the data-enable-buffer unit 26 have "0" in all bits thereof at the initial state, the falling-edge-detection circuit 25 detects a falling edge of the read-timing signal RTSW2ES, and generates a clear signal so as to clear the data-enable-buffer unit 26 at this falling-edge timing. That is, the dataenable-buffer unit 26 is cleared immediately after the data is read. The latch 27 introduces a predetermined length of delay to the read-address signal WADR3-0. Based on the read-address signal WADR3-0 which is delayed by the predetermined length of delay, the selector 28 selects data of two time slots from the 32-bit output of the data-enable-buffer unit 26 such that the selected data corresponds to the output data from the real-data-buffer unit 24. The selected data is provided to the D-FF 29-1. An output of the D-FF 29-1 is data-enable signal Den indicating a valid/invalid status of each bit of the terminal-output data Rdata.

FIGS. 5A through 5G are timing charts for explaining operations of the data-enable-buffer unit 26 and a portion relevant thereto. As shown in the figures, the data-enable-buffer unit 26 is cleared by the clear signal immediately after the data is read.

Figure 6:
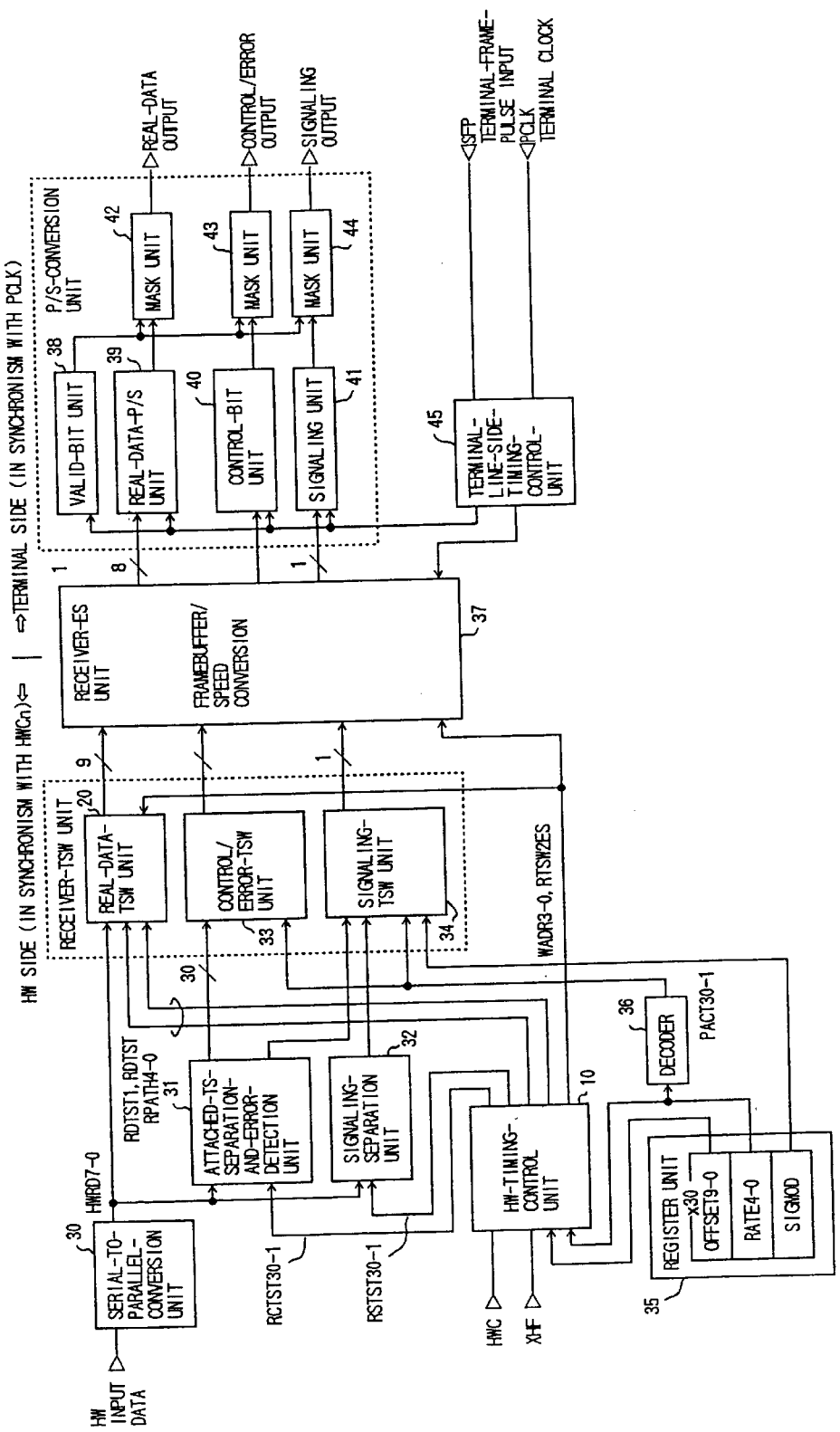
FIG. 6 is a block diagram showing an embodiment of a receiver circuit which employs the HWtiming-control unit and the real-data-TSW unit according to the present invention.

FIG. 6 is a block diagram showing an embodiment of a receiver circuit of the LSI 501 (FIG. 1) which employs the HW-timing-control unit 10 and the real-data-TSW unit 20 according to the present invention.

The receiver circuit of FIG. 6 includes a serial-to-parallel-conversion unit 30, an attached-TSseparation-and-error-detection unit 31, a signaling-separation unit 32, a control/error-TSW unit 33, a signaling-TSW unit 34, a register unit 35, a decoder 36, a receiver-ES unit 37, a valid-bit unit 38, a realdata-P/S unit 39, a control-bit unit 40, a signaling unit 41, mask units 42 through 44, and a terminal-lineside-timing-control unit 45 in addition to the HW-timing-control unit 10 and the real-data-TSW unit 20.

The serial-to-parallel-conversion unit 30 converts 4-bit data input from the communication lines to 8-bit data (HWRD7-0). The attached-TS-separation-and-error-detection unit 31 separates an attachedinformation time slot of each path, and attends-to error detection and protection. This process is performed with respect to each path. The signaling separation unit 32 separates and keeps signaling data during a multiple-signaling mode. The control/error TSW unit 33 rearranges error information (attached information) in terminal-side time slots. The signaling-TSW unit 34 rearranges the signaling data in the terminal-side time slots. The register unit 35 keeps the offset OFFSET, the communication-data rate RATE, and SIGMOD information with respect to each path. The decoder 36 decodes the communication-data rate RATE of each path and generates active signals PACT30-1 (30 bits) with respect to respective paths. If the communication-data rate RATE is zero for a given path, the active signal PACT of this path is zero. If the communication-data rate RATE is not zero for a given path, the active signal PACT of this path is 1.

The receiver-ES unit 37 serves as a means for synchronization since communication-line-side (HW-side) timings (HWC) are asynchronous with terminal-side timings (PCLK), and makes the HW data synchronize with PCLK by use of ES (elastic buffer). If the HW side and the PCLK side are in synchronism with each other, the receiver-ES unit 37 may be a simple one-frame buffer. The receiver-ES unit 37 may be implemented by using a dual-port RAM or the like.

The valid-bit unit 38, the real-data-P/S unit 39, the control-bit unit 40, the signaling unit 41, and the mask units 42 through 44 together form a P/S-conversion unit, which holds an output of the receiver-ES unit 37, and applies a serial conversion to 8-bit real data. When a valid bit of the valid-bit unit 38 receiving data from the data-enable-buffer unit 26 of FIG. 3B is zero, a current time slot is regarded as unused time slot, so that the mask units 42 through 44 attend to the mask processing of the terminal output. The terminal-line-side-timing-control unit 45 generates a receiver-ES-read-timing signal for outputting the terminal output.

In what follows, those elements of the receiver circuit of FIG. 6 which are relevant to the present invention will be described in detail.

Figure 7:
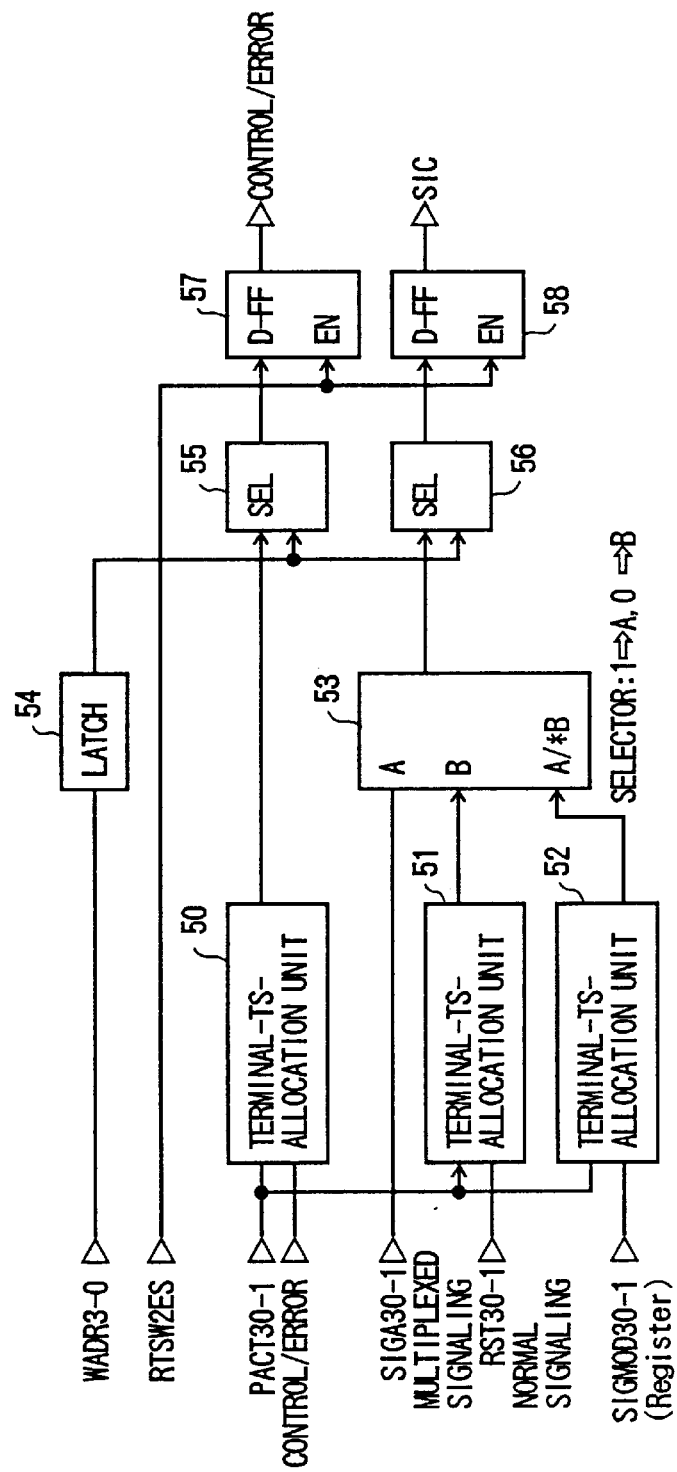
FIG. 7 is a block diagram showing a control/error-TSW unit and a signaling-TSW unit together.

FIG. 7 is a block diagram showing the control/error-TSW unit 33 and the signaling-TSW unit 34 together.

A configuration of FIG. 7 performs processing of allocating control/error information of each path to terminal-output time slots so as to fit in the terminal-output data after the control/error information (attached information) shown as F in FIG. 2 is separated from each path. Further, the configuration of FIG. 7 performs allocation to the terminal-output time slots so as to fit in the terminal-output data with regard to signaling information included in the attached information F in the normal mode.

A signaling signal indicates that the line is busy in the case of telephone, for example, and generally represents whether communication is in place or not. There are two modes for transmitting the signaling signal. One is a normal mode, and the other is a multiplex mode. In the normal mode, a 1-bit signaling signal is included in the attached information F. In the multiplex mode, a signaling time slot is attached to the real data at the front thereof to transmit signaling signals because a 1-bit signaling signal cannot represent information on a plurality of terminals when the plurality of terminals are multiplexed in the same path (e.g., when a plurality of telephones are connected to a single terminal). Detailed account of multiplexed signaling will be provided later. In FIG. 7, it is assumed that multiplexed-signaling signals SIGA30-1 have been already allocated to terminal-output time slots.

A configuration of FIG. 7 includes terminal-TS-allocation units 50 through 52, a selector 53, a latch 54, selectors 55 and 56, and D-FFs 57 and 58. The terminal-TS-allocation unit 50 receives the control/error signal from the attached-TS-separation-and-error-detection unit 31 of FIG. 6, and further receives the active signals PACT30-1 from the decoder 36 of FIG. 6. The terminal-TS-allocation unit 50 allocates the control/error signal to the terminal-output time slots based on the active signals PACT30-1. The terminal-TS-allocation unit 51 receives the signaling signals RST30-1 of the normal mode from the attached-TS-separationand-error-detection unit 31 of FIG. 6, and, also, receives the active signals PACT30-1 from the decoder 36 of FIG. 6. The terminal-TS-allocation unit 51 allocates the signaling signals RST30-1 to the terminal-output time slots based on the active signals PACT30-1. The terminal-TS-allocation unit 52 receives mode signals SIGMOD30-1 indicative of a signaling mode from the register 35 of FIG. 6, and, also, receives the active signals PACT30-1 from the decoder 36 of FIG. 6. The terminal-TS-allocation unit 51 allocates the mode signals SIGMOD30-1 to the terminal-output time slots based on the active signals PACT30-1.

The latch 54 delays the read-address signal WADR3-0 from the HW-timing-control unit 10 shown in FIG. 6. Based on the delayed read-address signal WADR30, the selector 55 reads the control/error information two time slots by two time slots from the terminal-TS-allocation unit 50. The control/error information is then stored in the D-FF 57. The latch timing of the DFF 57 is defined by the read-timing signal RTSW2ES.

The selector 53 receives from the terminal-TS-allocation unit 50 the signaling-mode signals SIGMOD30-1 allocated to the terminal-output time slots. The selector 53 selects the multiplexed-signaling signals SIGA30-1 when the signaling mode is a multiplex mode, and selects the signaling signals RST30-1 output from the terminal-TS-allocation unit 51 when the signaling mode is a normal mode. The multiplexed-signaling signals SIGA30-1 or the signaling signals RST30-1 of the normal mode selected by the selector 53 is read by a unit of two time slots at a time by the selector 56. The signaling signals are then stored in the D-FF 58. The latch timing of the DFF 58 is defined by the read-timing signal RTSW2ES. Outputs of the D-FFs 57 and 58 are supplied to the receiver-ES unit 37 shown in FIG. 6.

Figure 8:
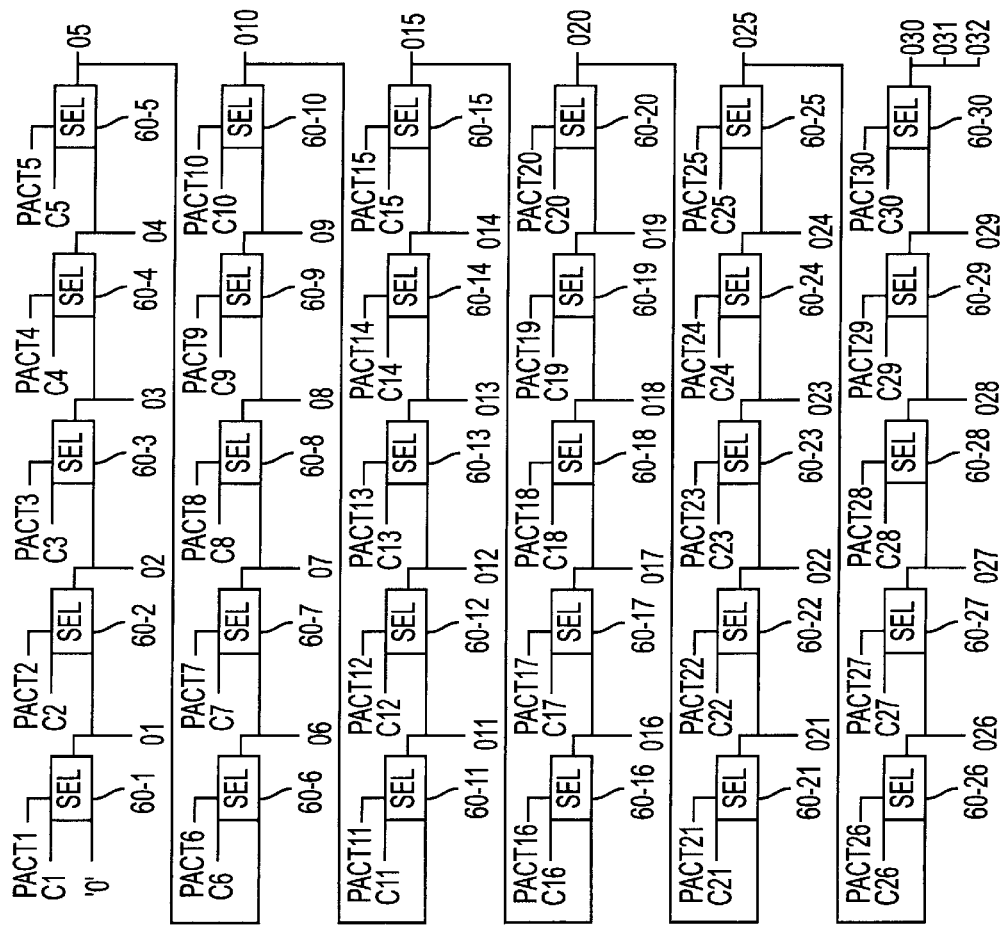
FIG. 8 is a circuit diagram of one of terminal-TS-allocation units.

FIG. 8 is a circuit diagram of one of the terminal-TS-allocation-units 50 through 52.

The terminal-TS-allocation unit of FIG. 8 includes selectors 60-1 through 60-30, which are connected in series to form a chain structure. The nth selector 60-n among the selectors 60-1 through 60-30 receives the active signal PACTn corresponding to the n-th time slot among the active signals PACT30-1, and further receives a signal Cn. The signal Cn is one of the n-th bit of the control/error information, the n-th bit of the signaling signals RST30-1, and the n-th bit of the signaling-mode signals SIGMOD30-1. In the case of the terminal-TS-allocation unit 51, for example, signals C1 through C30 are the signaling signals RST301.

The selector 60-1 further receives a signal "0". The selector 60-1 selects the signal C1 when the active signal PACT1 is 1, and selects the signal "0" when the active signal PACT1 is 0. The other selectors 60-2 through 60-30 receive an output of the respective preceding selector. The selector 60-n selects the signal Cn when the active signal PACTn is 1, and selects the output of the preceding selector when the, active signal PACTn is 0. As previously described, when the communication-data rate RATE of a given path is zero, the active signal PACT of this path is zero. On the other hand, a non-zero value of the communication-data rate RATE for a given path means that the active signal PACT of this path is 1.

Figure 9:
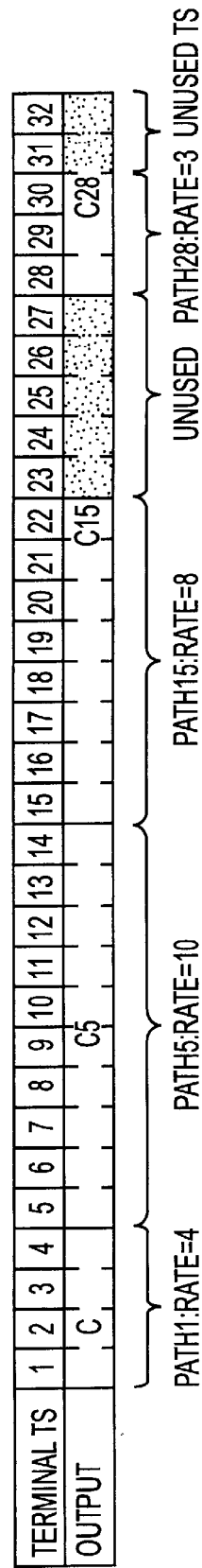
FIG. 9 is an illustrative drawing showing a resulting output of the terminal-TS-allocation unit shown in FIG. 8.

FIG. 9 is an illustrative drawing showing a resulting output of the terminal-TS-allocation unit shown in FIG. 8.

In FIG. 9, path 1 has the communication-data rate of 4, and path 5 has the communication-data rate of 10. Further, the communication-data rate of path 15 is 8, and the communication-data rate of path 28 is 3. Other paths have the communication-data rate of zero.

As shown in FIG. 9, the fifth time slot, which has a non-zero communication-data rate, is provided with a corresponding signal C5 as an output to this time slot. The sixth through fourteenth time slots also have the signal C5 as an output to these time slots since the corresponding selectors 60-6 through 60-14 select an output of the preceding selector.

In this manner, the signals C1–30 are provided at time-slot positions when paths are in existence at these time-slot positions on the side of the communication lines, i.e., when the communication data rate is not zero at these time-slot positions, and the signals C1–30 are extrapolated to other time slots where the communication-data rate is zero. This makes it possible to allocate the control/error information, the signaling signals, etc., to all the time slots which are used by the paths on the side of the terminal-output data.

In what follows, the signaling multiplexing will be described.

As previously stated, a time slot for signaling purposes is attached to the real data of each path at the front thereof in the multiplexed signaling mode. This signaling-purpose time slot is transmitted by use of multi-frames. Namely, a single signaling-purpose time slot is transmitted for a given path with respect to each frame. When a plurality of signaling-purpose time slots are put together over a plurality of frames, the data which is put together has a meaning thereto as signaling information regarding the given path.

FIG. 10 is an illustrative drawing showing a configuration of a signaling multi-frame.

In FIG. 10, signaling-purpose time slots which are supplied over 8 frames with respect to a given path are shown. Each signaling-purpose time slot is comprised of 8 bits from b0 to b7. Bits denoted as F, S, and X are not used. A signaling-purpose time slot of the first frame, for example, includes 8 bits (F, 0, S, X, X, X, X, X). A signaling-purpose time slot of the second frame is comprised of 8 bits (F, 1, S, A1, A2, A3, A4, A5).

The bit b1 of these signaling-purpose time slots makes up a bit pattern (0, 1, 1, 1, 1, 1, 1, 1) over the 8 frames. This bit pattern is used as a synchronization pattern. The bit An represents the nth signaling signal.

The entirety of what is shown in FIG. 10 constitutes signaling information on a given path. That is, a total of 30 signaling signals A1 through A30 can be transmitted with respect to a single path. In other words, a maximum of 30 multiple terminals can be provided for a single path. Since the maximum number of paths on the communication-line side is 30, a circuit for processing signaling information needs to have a capacity to process 30 signaling signals for 30 paths. A simple configuration would require a storage capacity of 900-bit (30×30 bit) information.

In the following, a circuit structure which can process signaling information by use of a small-scale circuit without a need to have a 900-bitinformatin-storage capacity will be described.

Figure 11:
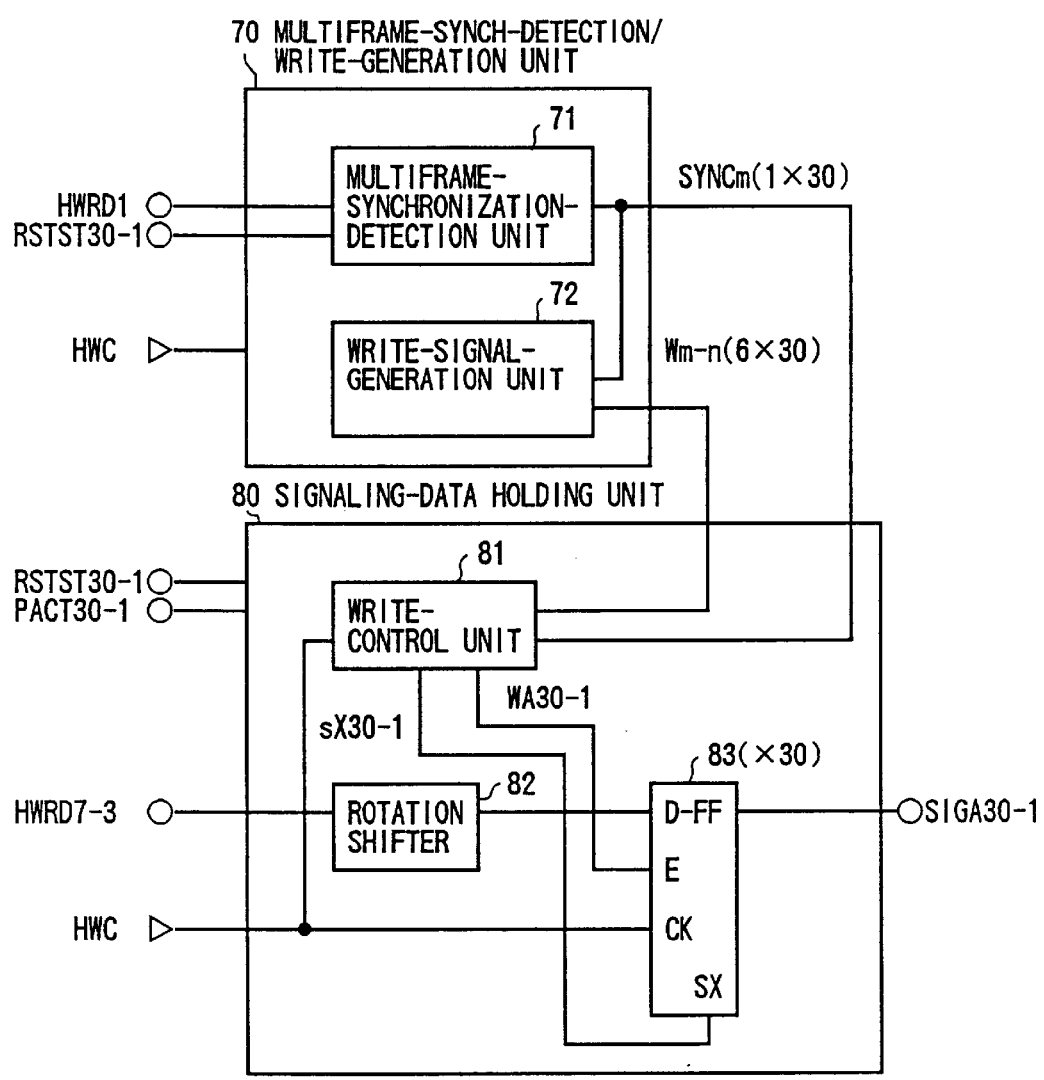
FIG. 11 is a block diagram of a signaling separation unit of FIG. 6.

FIG. 11 is a block diagram of the signaling-separation unit 32 of FIG. 6.

The signaling-separation unit 32 of FIG. 11 includes a multi-frame-synch-detection/write-generation unit 70 and a signaling-data holding unit 80.

The multi-frame-synch-detection/write-generation unit 70 includes a multi-framesynchronization-detection unit 71 and a write-signal-generation unit 72. The multi-framesynchronizationdetection unit 71 receives a multi-frame-synchronization signal HWRD1 (bit b1 of FIG. 10), and further receives signaling-TS-valid-timing signals RSTST30-1 from the HW-timing-control unit 10 of FIG. 6. Based on these received signals, the multi-frame-synchronization-detection unit 71 generates a synchronization signal SYNCm (m=1, 2, . . . 30) which is 1 when synchronization is established, and is 0 when no synchronization is in place. The synchronization signal SYNCm is a one-bit signal generated with respect to each of the 30 paths. The write-signal-generation unit 72 generates a write signal Wm-n based on the synchronization signal SYNCm. Here, m represents a path number, and n denotes a frame number. That is, the write signal W3-2, for example, corresponds to the second frame of the path 3, and is used for writing a signaling signal in the signaling-data holding unit 80 when the second frame of the path 3 is input.

The multi-frame-synch-detection/write-generation unit 70 has a configuration which is well within ordinary skill in the art, and is comprised of logic circuits such as flip-flops, counters, etc. The signaling-TS-valid-timing signals RSTST30-1 includes RSTST1 through RSTST30 corresponding to path 1 through path 30, respectively. One of the signaling-TS-valid-timing signals RSTST30-1 becomes active in response to the active path.

The signaling-data holding unit 80 includes a write-control unit 81, a rotation shifter 82, and 30 DFFs 83. Each of the D-FFs 83 stores 1-bit data, so that the set of the D-FFs 83 stores 30-bit data. The write-control unit 81 receives the write signal Wm-n to generate write signals WA30-1, which are respectively supplied to the D-FFs 83 as a write-enable signal. Further, the write-control unit 81 receives the synchronization signal SYNCm to generate synchronization-establishment signals sx30-1, thereby enabling data to be written in the D-FFs 83 only when synchronization is established. Data stored in the DFFs 83 is the input-communication data HWRD7-3 (from third bit to the seventh bit), which is supplied via the rotation shifter 82. The data stored in the D-FFs 83 is output as the multiplexed-signaling signals SIGA30-1 allocated to the terminal-output time slots.

Figure 12:
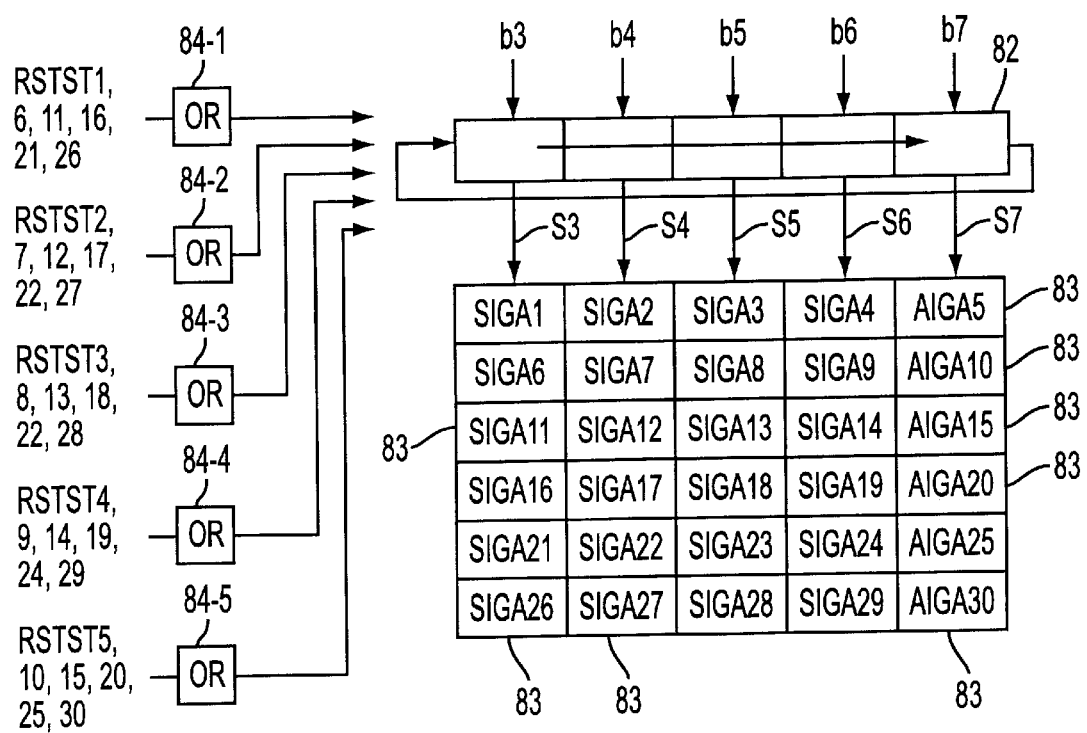
FIG. 12 is an illustrative drawing showing relations between a rotation shifter and D-FFs.

FIG. 12 is an illustrative drawing showing relations between the rotation shifter 82 and the D-FFs 83. The rotation shifter 82 receives HWRD3 through HWRD7, which are respectively the third bit through the seventh bit of the input-communication data HWRD7-0 (i.e., the data from the bit b3 to the bit b7 of FIG. 10), and applies an appropriate rotation shift before outputting the data to the D-FFs 83. An output line S3 of the rotation shifter 82 is connected in parallel to the first D-FF 83 corresponding to SIGA1, the sixth D-FF 83 corresponding to SIGA6, the eleventh D-FF 83 corresponding to SIGA11, the sixteenth D-FF 83 corresponding to SIGA16, the twenty first D-FF 83 corresponding to SIGA21, and the twenty sixth D-FF 83 corresponding to SIGA26. By the same token, each of output lines S4 through S7 is connected in parallel to a corresponding set of D-FFs 83 vertically aligned as shown in FIG. 12.

Figure 13:
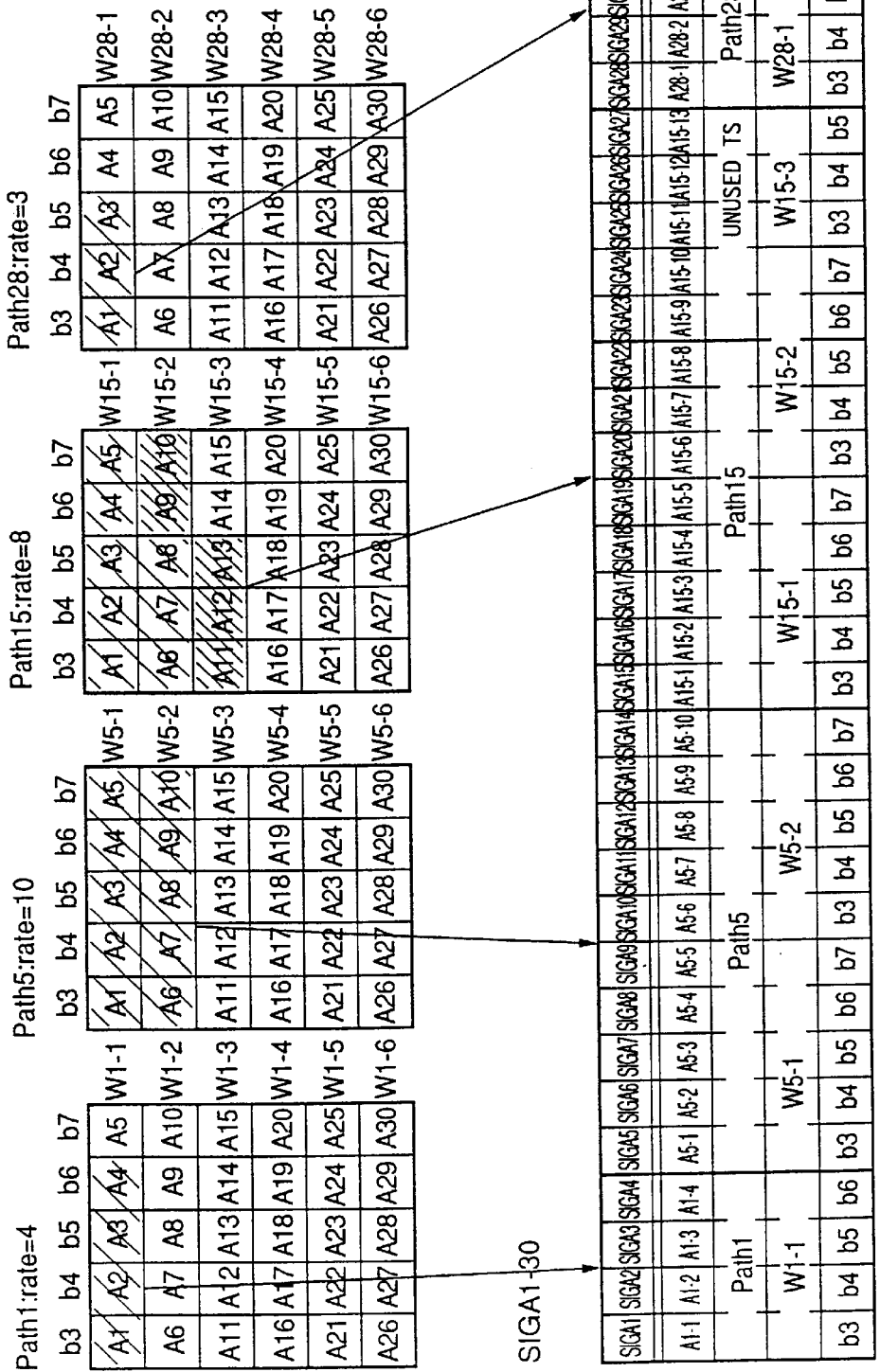
FIG. 13 is an illustrative drawing for explaining operations of a signaling-data holding unit shown in FIG. 11.

FIG. 13 is an illustrative drawing for explaining operations of the signaling-data holding unit 80 shown in FIG. 11. FIG. 13 shows an exemplary case in which the path 1, the path 5, the path 15, and the path 28 have the communication-data rate RATE of 4, 10, 8, and 3, respectively. Other paths have the communication-data rate of zero. In FIG. 13, Am-n represents a signaling signal An of path m.

As shown in FIG. 13, the signaling signals A1 through A4 of the path 1 are stored in the first one through the fourth one of the D-FFs 83 as SIGA1 through SIGA4, respectively. The signaling signals A1 through A10 of the path 5 are stored in the fifth one through the fourteenth one of the D-FFs 83 as SIGA5 through SIGA14, respectively. Further, the signaling signals A1 through A8 of the path 15 are stored in the fifteenth one through the twenty second one of the DFFs 83 as SIGA15 through SIG22, respectively. Finally, the signaling signals A1 through A3 of the path 28. are stored in the twenty eighth one through the thirtieth one of the D-FFs 83 as SIGA28 through SIGA30, respectively. In this case, SIGA23 through SIGA27 are actually unused, but the signaling signals A9 through A13 of the path 15 are written as shown in the figure. These unused portions are later masked by the data-enable signals, so that the data written in these portions does not cause any problem.

When the example of FIG. 13 is related to the illustration of FIG. 12, it is understood that A1 through A5 (bit b3 through bit b7) of the path 1 should be output to the output lines S3 through S7, respectively, without any rotation shift, so that A1 through A4 are written in the first one through the fourth one of the D-FFs 83. Further, A1 through A5 (bit b3 through bit b7) which are the signaling signals included in the first frame among the signaling signals A1 through A10 of the path 5 should be subjected to a rotation shift to the right by 4 bits, so that A1 is supplied to the output line S7, and A2 through A5 are supplied to the output lines S3 through S6, respectively, being stored in the fifth one through the ninth one of the D-FFs 83. A6 through A10 (bit b3 through bit b7) which are included in the second frame among the signaling signals A1 through A10 of the path 5 should also be subjected to a 4-bit-to-the-right rotation shift so as to be stored in the tenth through fourteenth ones of the D-FFs 83. By the same token, the path 15 should undergo a rotation shift to the right by 4 bits, and the path 28 should experience a rotation shift to the right by 2 bits.

In general, the path n should be subjected to a rotation shift by (n-1)%5 bits (x%y means a residual after dividing x by y).

In order to achieve this operation, OR circuits 84-1 through 84-5 are provided as shown in FIG. 12 to perform a rotation shift to the right by an appropriate number of bits in accordance with a given path number. The OR circuit 84-n receives the signaling-TS-valid-timing signals RSTSTn, RSTSTn+5, RSTSTn+10, RSTSTn+15, RSTSTn+20, and RSTSTn+25 (i.e., n+multiple of 5). When a certain path is valid, one of the OR circuits 84-1 through 84-5 which receives a signaling-TS-valid-timing signal corresponding to this valid path generates an active output. Outputs of the OR circuits 84-1 through 84-5 control the operations of the rotation shifter 82, thereby achieving a rotation shift to the right by a bit number ranging from 0 bit to 4 bits. By use of this configuration, an arrangement of FIG. 13 can be put in place by performing no rotation shift with respect to the path 1, a 4-bit-to-the-right rotation shift with respect to the path 5 and the path 15, and a 2-bit-to-the-right rotation shift with respect to the path 28.

In order to write the outputs from the rotation shifter 82 in the D-FFs 83, the enable signals are supplied to the D-FFs 83. As previously described, a signaling signal corresponding to the n-th frame of the path m is written by using the write signal Wm-n. To this end, the write signal Wm-n should be supplied to an appropriate one of the D-FFs 83 as an enable signal. This control is attended to by the write-control unit 81.

Figure 14:
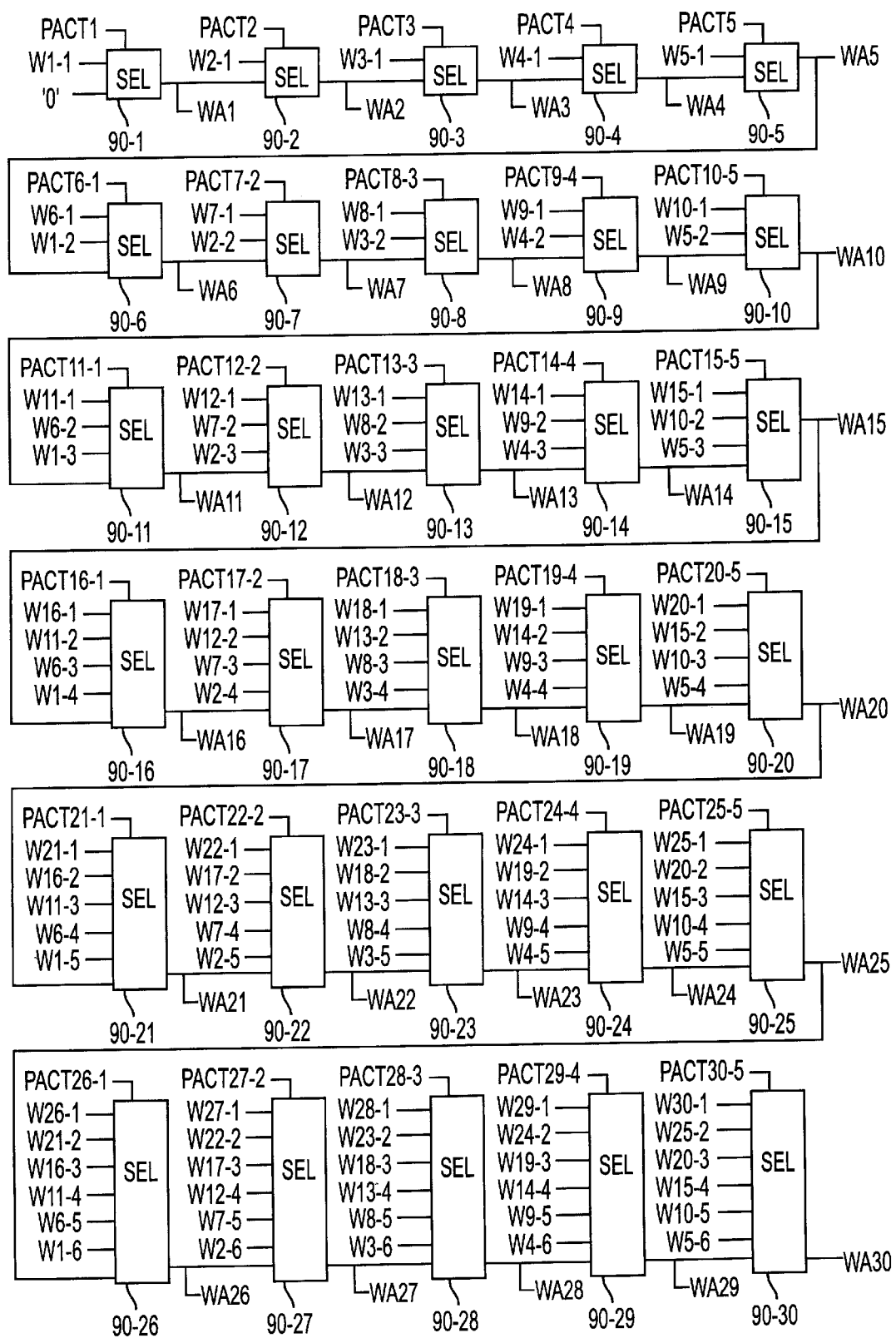
FIG. 14 is a circuit diagram of a write-control unit.

FIG. 14 is a circuit diagram of the write-control unit 81. The write-control unit 81 of FIG. 14 includes selectors 90-1 through 90-30. The selectors 90-1 through 90-30 are connected in series to form a chain structure in which a selector receives as an input thereof an output from a preceding selector. Each of the selectors 90-1 through 90-30 receives one or more write signals Wm-n (write signal for the path m of the n-th frame) in addition to the output from the preceding selector.

Signals supplied to the selectors 90-1 through 90-30 for the purpose of selection control are one or more bits of the active signals PACT30-1. Each of the selectors 90-1 through 90-30 selects the output from the preceding selector when one or more bits of the supplied active signals PACT30-1 are all zero. When one of these bits is 1 and there is a write signal input corresponding to this bit, this write signal is selected. If there is no write signal input corresponding to this bit having the value of 1, the output from the preceding selector is selected. Here, the active signals PACT30-1 have a respective priority order in accordance with the ordinal numbers thereof (see the following example). Outputs WA1 through WA30 from the selectors 90-1 through 90-30 are respectively supplied to the first through thirtieth ones of the DFFs 83 as an enable signal for writing data.

A description of operations will be given below by taking the 15-th selector 90-15 as an example. The selector 90-15 receives an output from the preceding selector 90-14, and, also, receives the write signals W15-1, W10-2, and W5-3. As selection-control signals, the active signals PACT15-5 (from 5-th PACT5 to 15-th PACT15) are supplied.

If all the bits from PACT5 to PACT15 are zero, the output of the preceding selector 90-14 is selected.

If PACT15 is 1, the write signal W15-1 is selected;
else if one of PACT11 through PACT14 is 1, the output of the preceding selector 90-14 is selected;
else if PACT10 is 1, the write signal W10-2 is selected;
else if one of PACT6 through PACT9 is 1, the output of the preceding selector 90-14 is selected;
else if PACT5 is 1, the write signal W5-3 is selected.

In this manner, if PACTn is 1, selection is made to pick the write signal Wn-x (x is one of 1 through 6).

The reason why selection is made this way is as follows. In the example of FIG. 13, the signaling signal stored in the 15-th D-FF 83-is the signaling signal A15-1 which is the first signaling signal of the path 15. When an example having a path configuration different from that of the example of FIG. 13 is considered, however, the 15-th D-FF 83 may store another signaling signal in stead of the signaling signal A15-1. For example, if path 14 was in existence, it would be possible that the signaling signal A14-2, which is the second signaling signal of the path 14, is stored in the 15-th D-FF 83. By the same token, if path 13 was in existence, the signaling signal A13-3 would be possibly stored. Alternately, it would be possible that the signaling signal A1-15 of the path 1 is stored. In this manner, the 15-th D-FF 83 may store a signaling signal-of any one of the path 1 through the path 15.

First, consideration is given to the example in which the signaling signal A15-1 of the path 15 is stored. In this case, the active signal PACT15 is 1, so that the write signal W15-1 is selected to place the 15-th D-FF 83 in a write-enable condition. The rotation shifter 82 of FIG. 12 performs a rotation shift to the right by 4 bits, so that the signaling signal A15-1 (bit b3) of the path 15 is stored in the 15-th DFF 83 via the output line S7.

Next, consideration is given to the example in which the signaling signal A14-2 of the path 14 is stored. In this case, the active signal PACT14 is 1, so that the output of the preceding selector 90-14 is selected. In the preceding selector 90-14, the write signal W14-1 is selected by PACT14. The selector 90-15 thus selects the write signal W14-1 output from the preceding selector 90-14, and places the 15-th D-FF 83 in a write-enable condition. The rotation shifter 82 of FIG. 12 performs a rotation shift to the right by 3 bits, so that the signaling signal A14-2 (bit b4) of the path 14 is stored in the 15-th D-FF 83 via the output line S7.

Next, consideration is given to the example in which the signaling signal A1-15 of the path 1 is stored. In this case, the active signal PACT1 is 1. Since all the active signals PACT15-5 are zero, the selector 90-15 selects the output of the preceding selector 90-14. In the preceding selector 90-14, all the active signals PACT14-4 are also zero, so that the output of the preceding selector 90-13 is selected. The active signal PACT1 having the value of 1 is used for signal selection only in the selector 90-11, where the write signal W1-3 is selected because of this PACT1. The write signal W1-3 is for the third frame of the path 1. This corresponds to the fact that A1-15 is contained in the third frame.

As can be known from the above description, the selector 90-15 ends up outputting the write signal W1-3 which is passed over from the selector 90-11. The write signal W1-3 prompts the 15-th D-FF 83 to be in a write-enable condition. The rotation shifter 82 of FIG. 12 performs no rotation shift in this case, so that the signaling signal A1-15 (bit b7) of the path 1 is stored in the 15-th D-FF 83 via the output line S7.

In this manner, the outputs of the rotation shifter 82 of FIG. 12 are written in the D-FFs 83 based on the write signal WA1 through WA30 generated by the write-control unit 81 of FIG. 14. This achieves appropriate allocation of the signaling signals to the terminal-output time slots in the signaling multiplex mode, thereby generating the multiplexed-signaling signals SIGA30-1.

In general, the write signal WAn for path n (n-th time slot on the side of the terminal) can be generated by a selector which has {(n-1)/(the number of signaling signals in one frame of the signaling-purpose time slot)+2} inputs. In the example of FIG. 14, the number of signaling signals in one frame is five (bit b3 through bit b7), so that the selector 90-15 for outputting WA15 has 4 inputs (i.e., {(15-1)/5+2} inputs).

Figure 15:
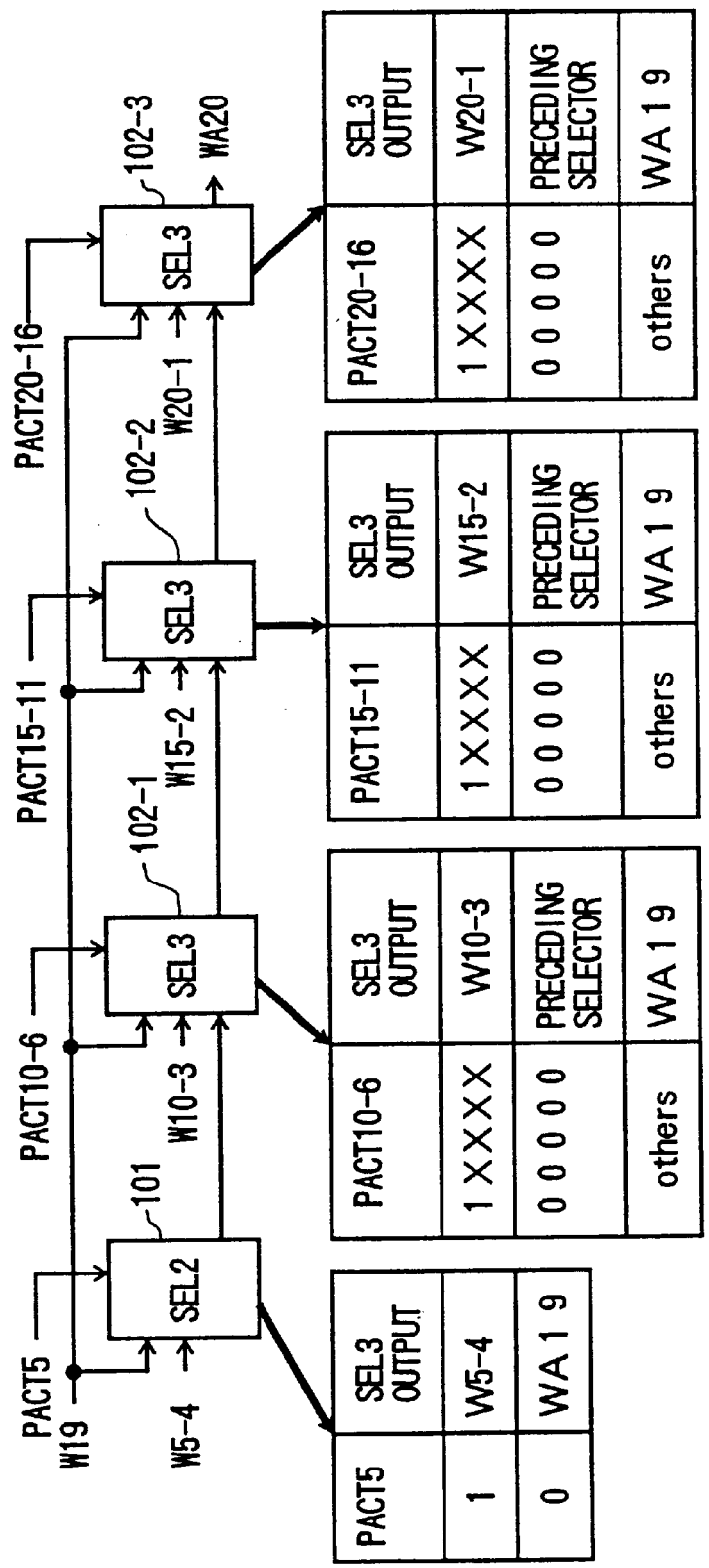
FIG. 15 is a block diagram of a selector shown in FIG. 14.

FIG. 15 is a block diagram of a selector shown in FIG. 14. FIG. 15 shows a configuration of the selector 90-20 as an example.

The selector 90-20 of FIG. 15 includes a 2-input selector 101 and 3-input selectors 102-1 through 102-3. The 2-input selector 101 receives the output WA19 of the selector 90-19 shown in FIG. 14, and further receives the write signal W5-4. As a selection-control signal, the active signal PACT5 is also supplied to the 2-input selector 101. As shown in FIG. 15, one of the write signals W5-4 and WA19 is selected based on the value of the active signal PACT5.

The 3-input selectors 102-1 through 102-3 receive, as three inputs thereof, the output WA19 of the selector 90-19 shown in FIG. 14, an output of a respective preceding selector of FIG. 15, and a corresponding one of the write signals W10-3, W15-2, and W20-1. As shown in FIG. 15, one of these three inputs is selected in accordance with a bit pattern of corresponding active signals PACT.

Figure 16:
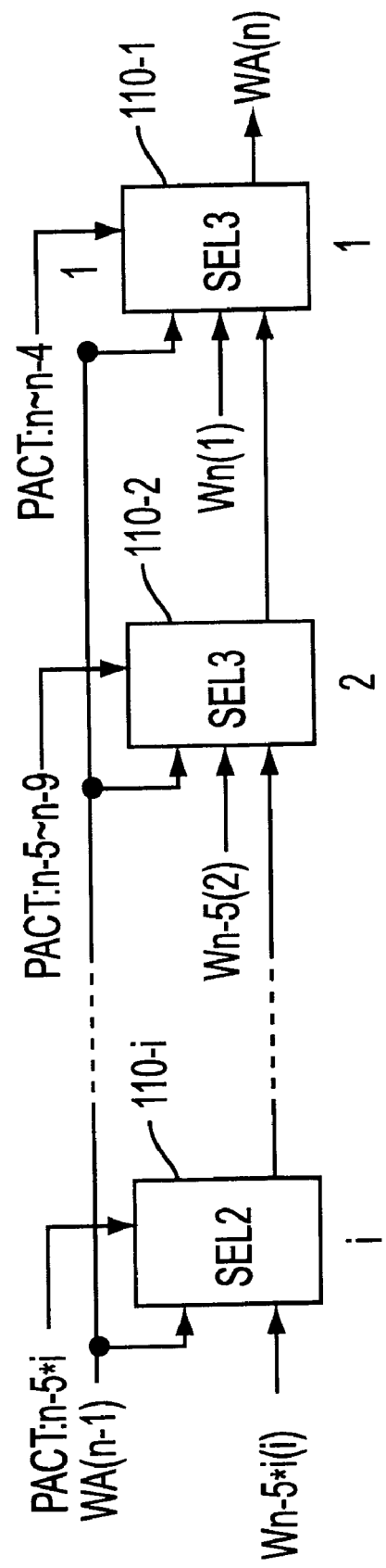
FIG. 16 is a block diagram showing a generalized configuration of a selector shown in FIG. 15.

FIG. 16 is a block diagram showing a generalized configuration of a selector shown in FIG. 14.

As shown in FIG. 16, a selector 90-n includes selectors 110-1 through 110-i. The number i of the selectors is determined as {(n-1)/(the number of signaling signals in one frame of the signaling-purpose time slot)+1}. Among the i selectors, only the leftmost selector 110-i is a 2-input selector. Others are 3-input selectors. The selector 90-20, for example, can be implemented by using four selectors (i.e., {(20-1)/5+1} selectors).

Based on the configuration of FIG. 16, any one of the selectors 90-1 through 90-30 of FIG. 14 can be implemented by using a 2-input selector and 3-input selectors.

Figure 17:
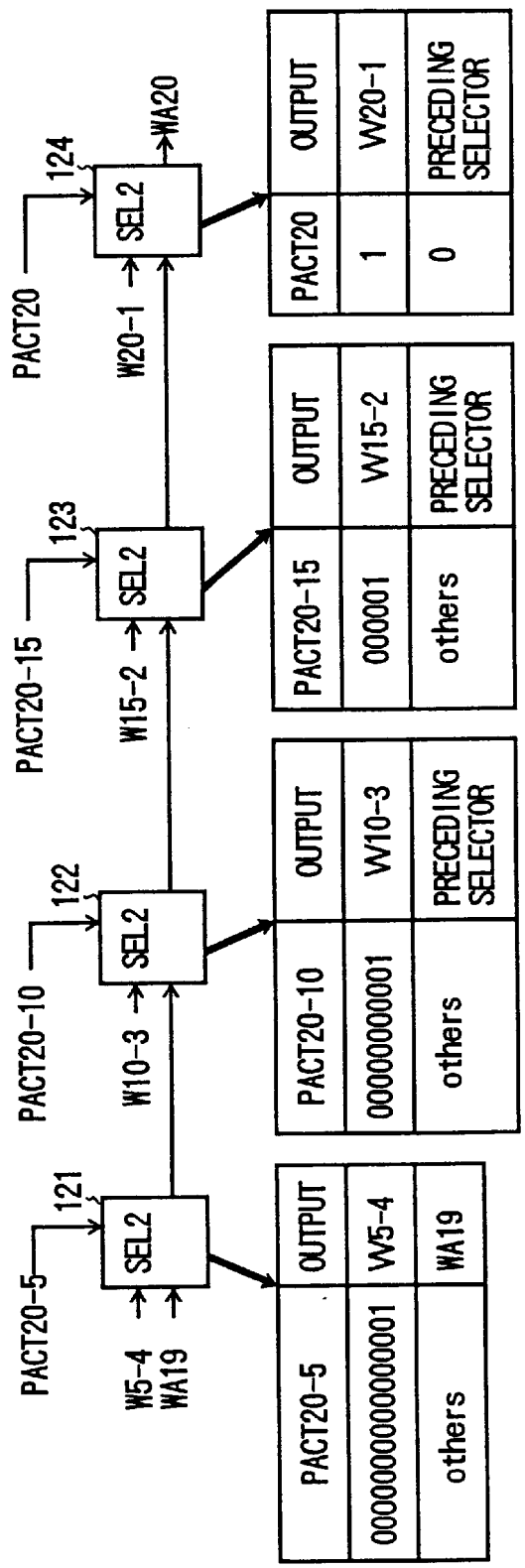
FIG. 17 is a block diagram showing another configuration of a selector shown in FIG. 14.

FIG. 17 is a block diagram showing another configuration of a selector shown in FIG. 14. FIG. 17 shows a configuration of the selector 90-20 as an example.

The selector configuration shown in FIG. 15 has room for improvement since a selector of each stage receives the write signal WA19 from the preceding selector 90-19. A selector of FIG. 17 has a configuration in which only the leftmost selector receives the write signal WA19, so that all the selectors can be comprised of a 2-input selector.

The selector 90-20 of FIG. 17 includes 2-input selectors 121 through 124. The leftmost 2-input selector 121 receives the output WA19 of the selector 90-19 of FIG. 14 and the write signal W5-4 as two inputs thereof. As selection-control signals, the active signals PACT20-5 are supplied. As shown in FIG. 17, one of the write signals W5-4 and WA19 is selected based on a bit pattern of the active signals PACT20-5.

The 2-input selectors 122 through 124 receive, as two inputs thereof, an output of a respective preceding-stage selector and a corresponding one of the write signals W10-3, W15-2, and W20-1. As shown in FIG. 17, one of these two inputs is selected in accordance with a bit pattern of corresponding active signals PACT.

Figure 18:
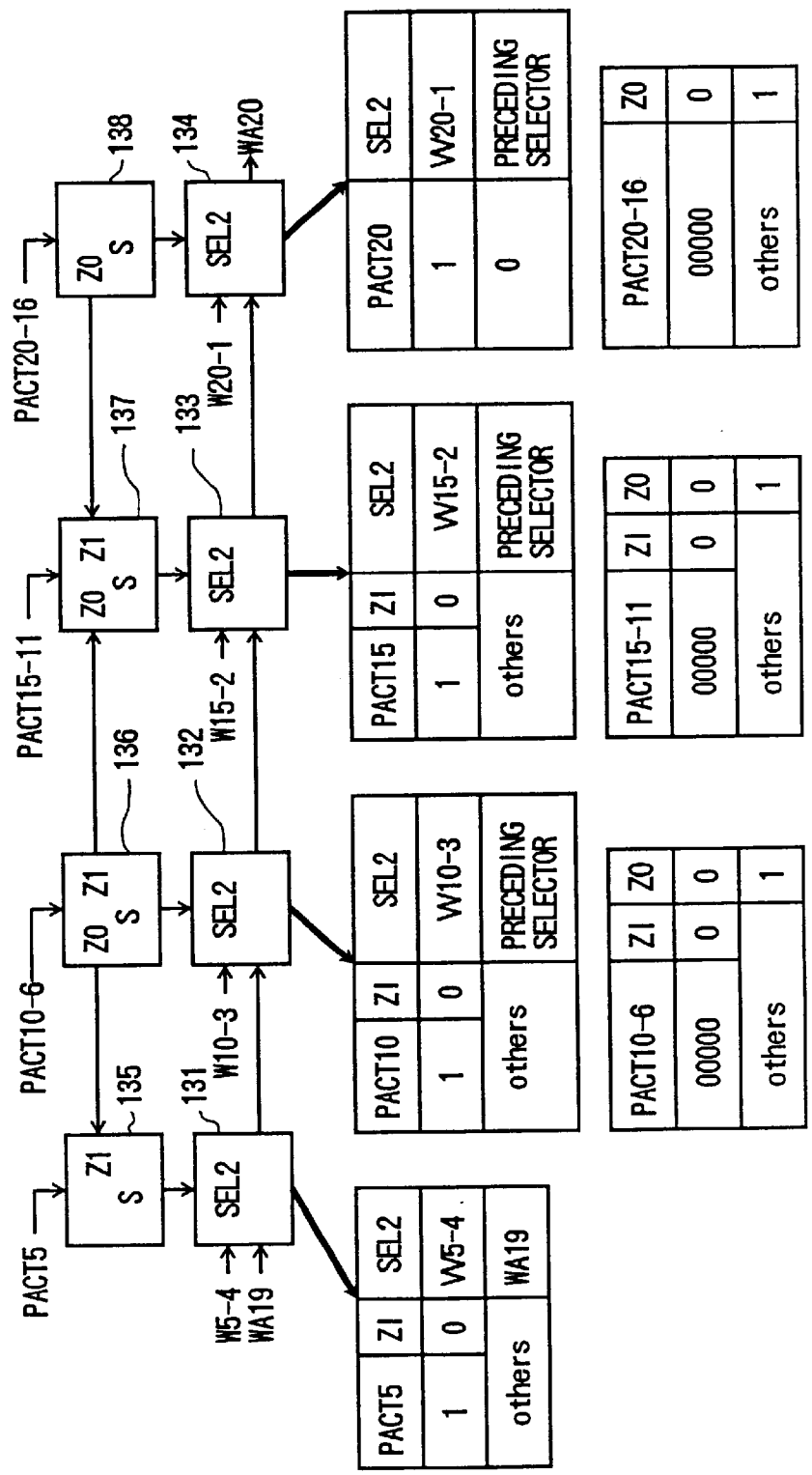
FIG. 18 is a block diagram showing a variation of the selector shown in FIG. 17.

FIG. 18 is a block diagram showing a variation of the selector 90-20 shown in FIG. 17.

Each of the selectors 121 through 124 shown in FIG. 17 makes a signal selection based on active signals regarding a corresponding path and following paths (i.e. paths having a larger path number than the corresponding path). What matters with regard to the active signals for the following paths is whether all the bits thereof are zero. Because of this, it is inefficient to supply active signals regarding the following paths to a selector of each stage. In the configuration of FIG. 18, thus, circuits are provided with an aim of checking whether all the bits of the active signals are zero, thereby achieving a more straightforward configuration.

The selector 90-20 of FIG. 18 includes 2-input selectors 131 through 134 and zero-check circuits 135 through 138. The leftmost 2-input selector 131 receives the output WA19 of the selector 90-19 of FIG. 14 and the write signal W5-4. As a selection-cotnrol signal, an output of the zero-check circuit 135 is supplied. As shown in FIG. 18, one of the write signals W5-4 and WA19 is selected based on a combination of the active signal PACT5 and a signal ZI, which is received from the zero-check circuit 136 provided at the following stage.

The 2-input selectors 132 through 134 receive the output of a respective preceding-stage selector and a corresponding one of the write signals W10-3, W15-2, and W20-1. As a selection-control signal, an output of a corresponding one of the zero-check circuits 136 through 138 is supplied. As shown in FIG. 18, one of the two input signals is selected based on a combination of a 1-bit information of a corresponding active signal PACT and a signal ZI input to the corresponding zero-check circuit. As an exception, however, the 2-input selector 134 makes an input selection by using only a 1-bit information of a corresponding active signal PACT20.

The zero-check circuit 138 receives the active signals PACT20-16, and outputs "0" to the preceding zero-check circuit 137 if all the bits of the active signals PACT20-16 are zero. If all the bits are not zero, the preceding zero-check circuit 137 receives "1".

The zero-check circuits 136 and 137 receive active signals PACT10-6 and PACT15-11, respectively. If all the bits of the corresponding active signals and the input ZI from the following zero-check circuit are 0, an output of "0" is supplied to the preceding zero-check circuit. If there is at least one bit which is 1, an output of "1" is supplied to the preceding zero check circuit.

The zero-check circuit 135 receives the active signal PACT5 and a signal from the following zero-check circuit 136, and supplies a selection-control signal to the selector 131 in accordance with these signals.

Figure 19:
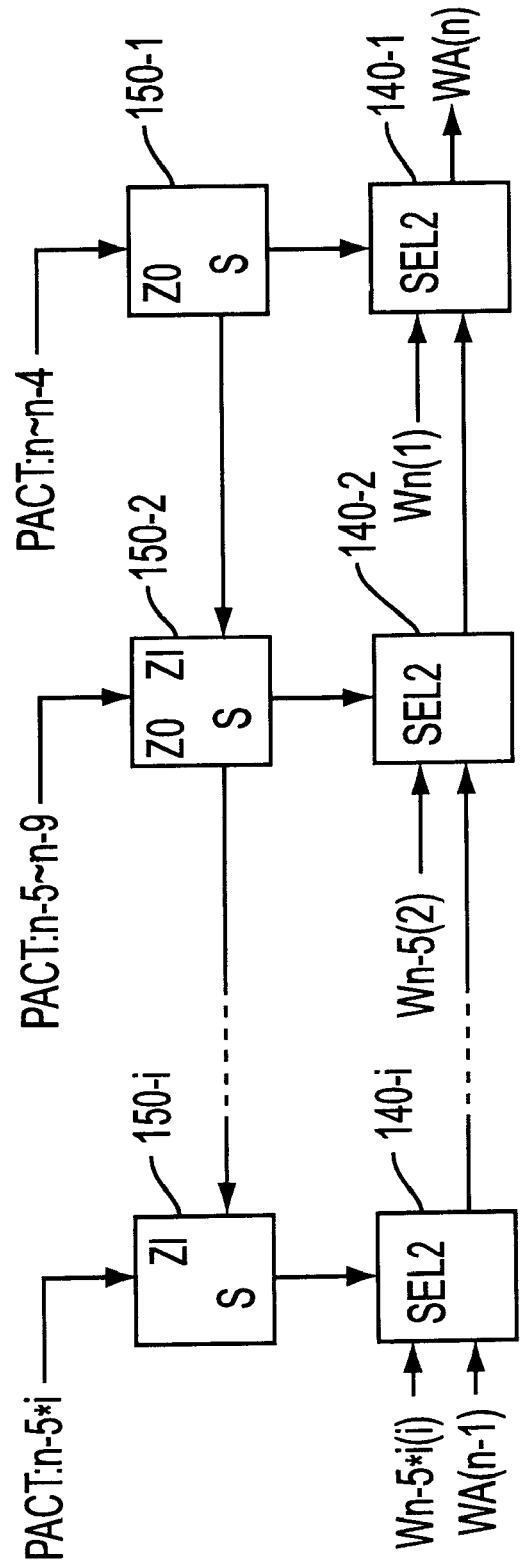
FIG. 19 is a block diagram of a generalized configuration of a selector shown in FIG. 18.

FIG. 19 is a block diagram of a generalized configuration of a selector shown in FIG. 18.

As shown in FIG. 19, a selector 90-$n$ includes i 2-input selectors 140-1 through 140-$i$ and i zero-check circuits 150-1 through 150-$i$. The number i of the 2-input selectors and the zero-check circuits is determined as {(n-1)/(the number of signaling signals in one frame of the signaling-purpose time slot)+1}. The selector 90-20, for example, is implemented by using four 2-input selectors and four zero-check circuits (i.e., {(20-1)/5+1} 2-input selectors and {(20-1)/5+1} zero-check circuits).

Based on the configuration of FIG. 19, any one of the selectors 90-1 through 90-30 of FIG. 14 can be implemented by using 2-input selectors.

The above description has been provided with regard to a system which generates the terminal-output data according to the principle of the present invention. In the following, issues on enhancement of reliability of such a system will be described.

Figure 1:
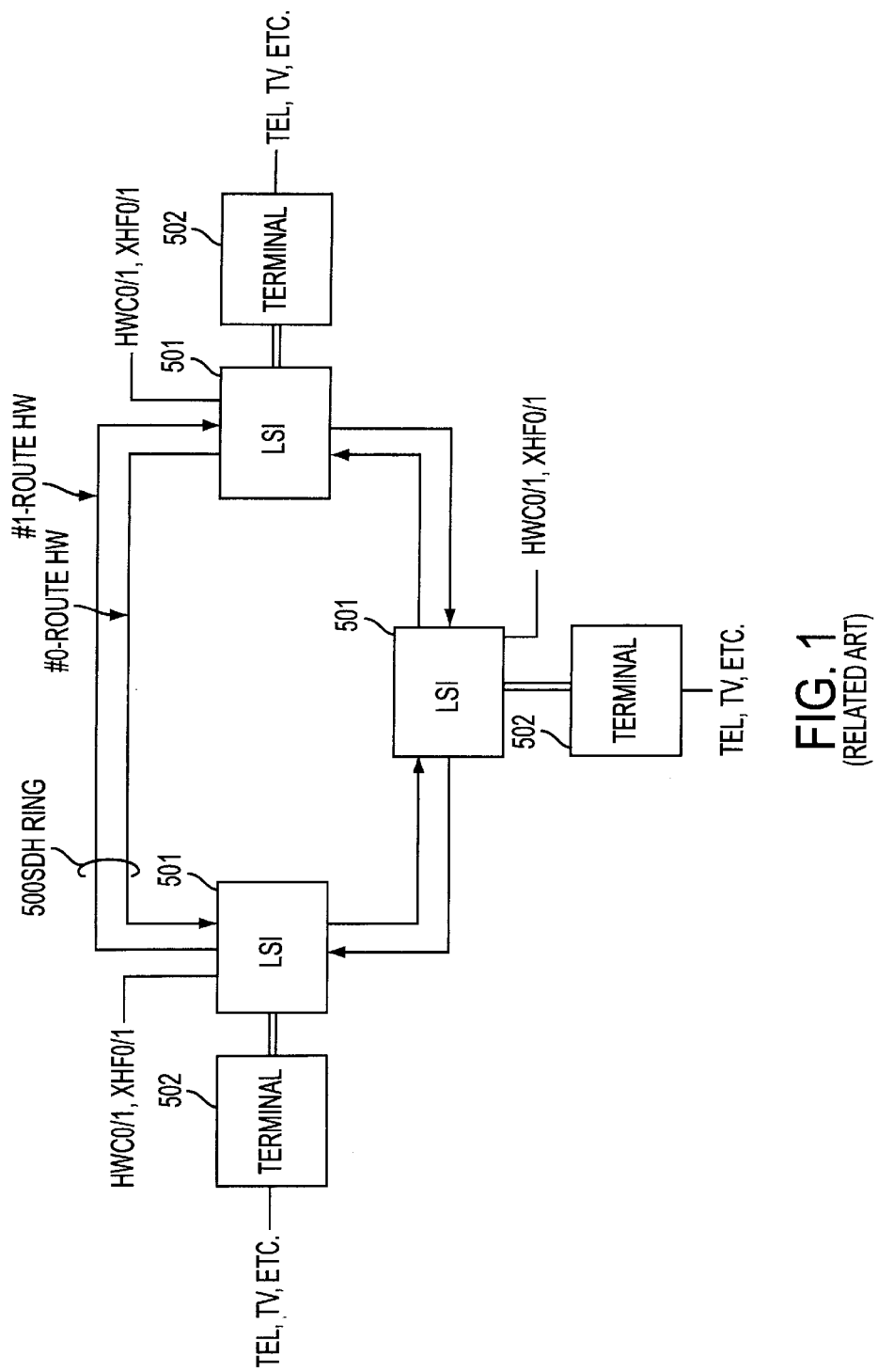
FIG. 1 is an illustrative drawing showing an example of an SDH-ring system of the related art.

In a communication system such as the system described above, two transmission routes are generally provided in order to enhance reliability of the communication line. In FIG. 1, these two transmission routs are shown as #0-route HW and #1-route HW. With the two transmission routes put in place, errors occurred in a route of current use can be escaped by switching to the other route.

In the case of a point-to-point communication format, the switching of the routes can be performed with regard to all the data of one frame since there is only one partner to communicate. A circuit configuration to achieve the switching of the routes can be relatively simple. In the case of a point-to-multipoint communication format as shown in FIG. 1 where there are a plurality of parties to communicate, a route switch must be made with respect to each different path since data are multiplexed in the terminal output with regard to a plurality of communication parties. A communication baud rate may vary for each path, so that the circuit for achieving the switching of the routes is likely to be complex and of a large scale.

In such a communication system as described in a previous part of this specification, further, functions to insert and/or check test patterns and conduct loop-back operations are provided for the purpose of testing the system. In the case of a point-to-point communication format, the insertion/check of test patterns and the loop-back operations can be performed with regard to all the data of one frame since there is only one partner to communicate. A circuit configuration to achieve this can be relatively simple. In the case of a point-to-multipoint communication format as shown in FIG. 1 where there are a plurality of parties to communicate, the insertion/check of test patterns and the loop-back operations must be performed only with respect to a particular path since data are multiplexed in the terminal output with regard to a plurality of communication parties. A communication baud rate may vary for each path, so that the circuit for achieving this is likely to be complex and of a large scale.

Accordingly, there is a need for a small-scale circuit which can switch the routes with respect to each path when the paths are provided in an order of free choice on the side of the communication lines in a system employing a point-to-multipoint connection and an adjustable communication baud rate.

Further, there is a need for a small-scale circuit which inserts and/or checks a test pattern with respect to a particular path when the paths are provided in an order of free choice on the side of the communication lines in a system employing a point-to-multipoint connection and an adjustable communication baud rate.

In the following, a circuit configuration which switches the routes with respect to each different path will be described according to the present invention.

When two transmission routes #0-route HW and #1-route HW are put in place, the system shown in FIG. 6 is provided for each of the routes, so that two sets of terminal outputs are obtained. The two sets of terminal outputs (outputs from the P/S-conversion unit) need to be subjected to path-wise selection.

Figure 20A:
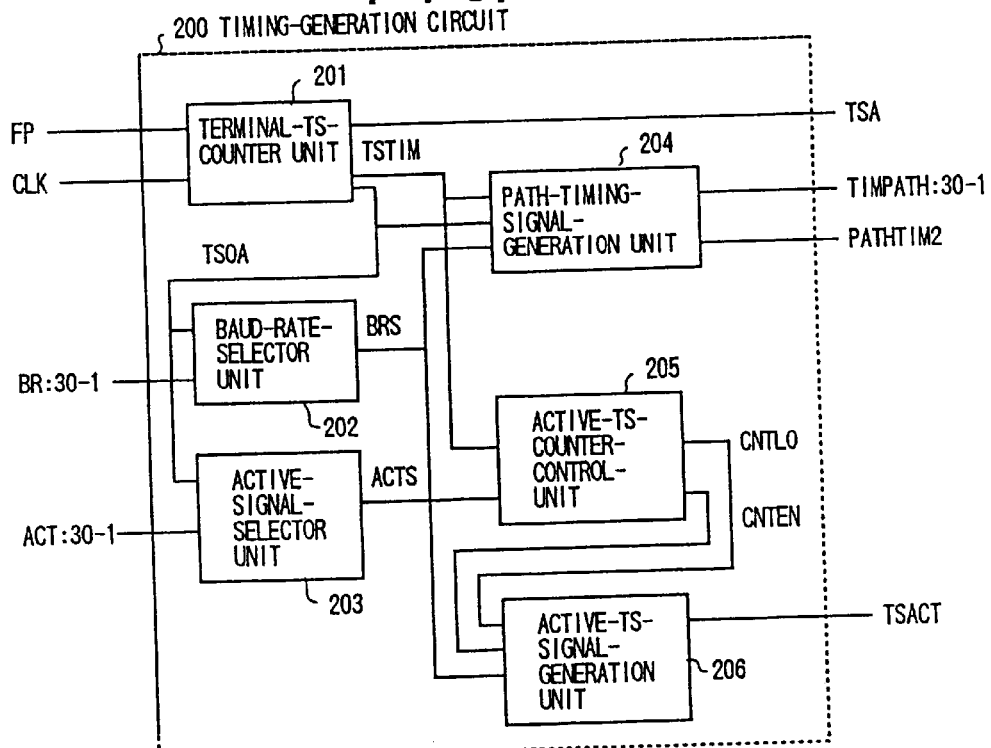
FIG. 20A is a block diagram of a timing-generation circuit.
Figure 20B:
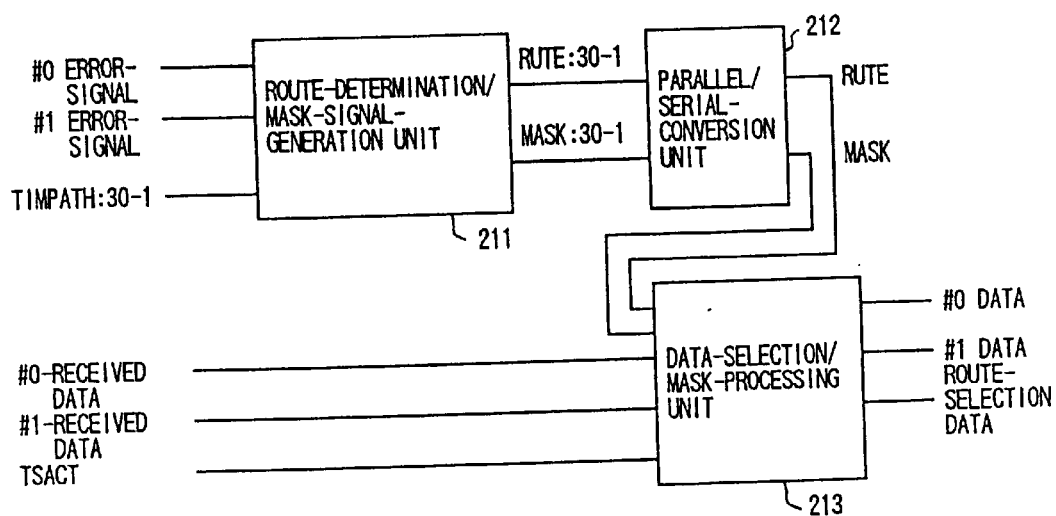
FIG. 20B is a block diagram of a configuration which makes a route selection based on timing signals generated by the timing-generation unit.

FIG. 20A is a block diagram of a timing-generation circuit, and FIG. 20B is a block diagram of a configuration which makes a route selection based on timing signals generated by the timing-generation unit.

A timing-generation circuit 200 of FIG. 20A includes a terminal-TS-counter unit 201, a baud-rateselector unit 202, an active-signal-selector unit 203, a path-timing-signal-generation unit 204, an active-TScounter-control unit 205, and an active-TS-signal-generation unit 206.

Figure 21:
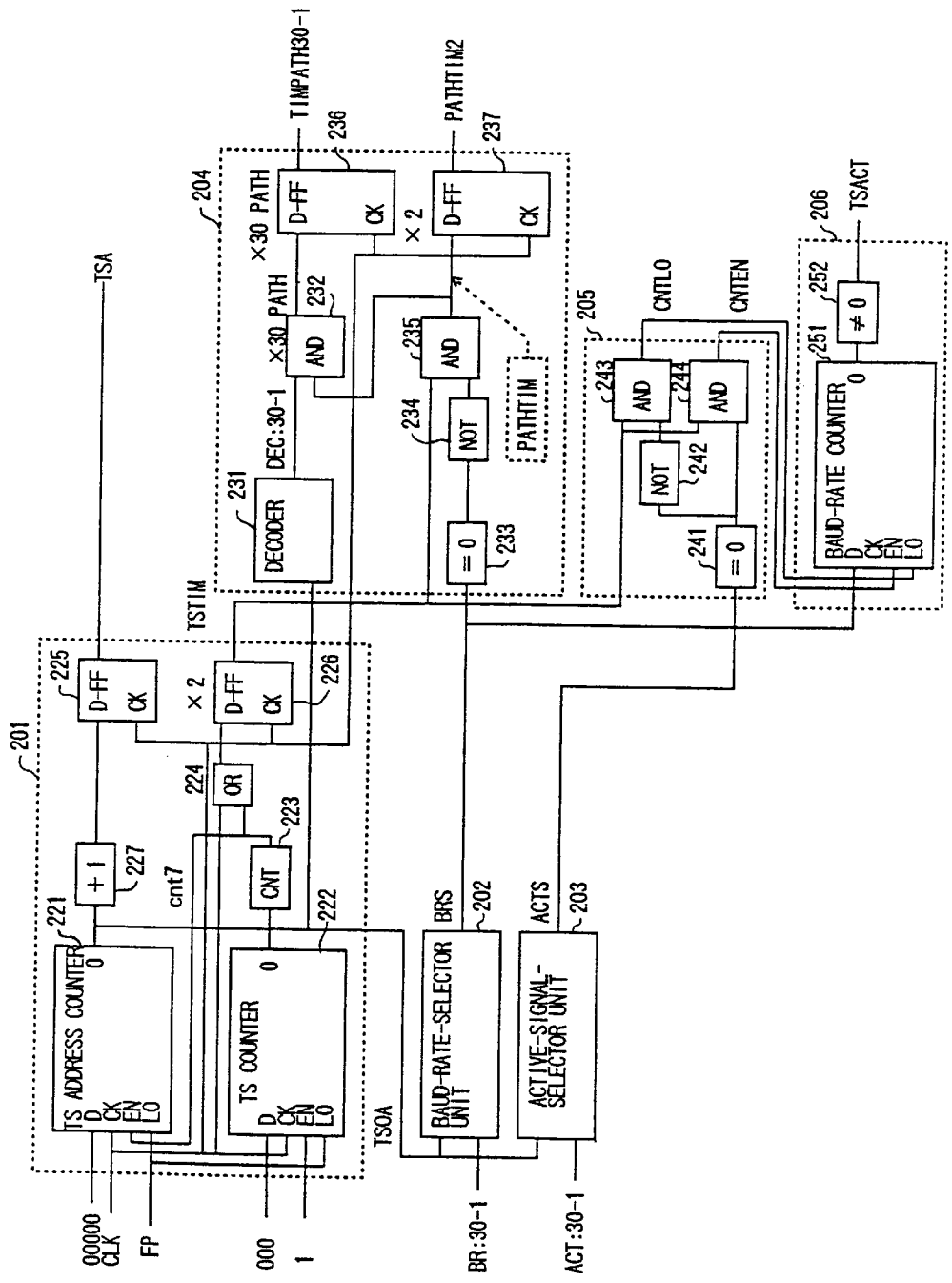
FIG. 21 is a circuit diagram showing detailed configurations of a terminal-TS-counter unit, a pathtiming-signal-generation unit, an active-TS-countercontrol unit, and an active-TS-signal-generation unit of FIG. 20A.

FIG. 21 is a circuit diagram showing detailed configurations of the terminal-TS-counter unit 201, the path-timing-signal-generation unit 204, the active-TS-counter-control unit 205, and the active-TS-signalgeneration unit 206 of FIG. 20A.

The terminal-TS-counter unit 201 counts 32 terminal TSs (time slots) by starting at the input of the frame pulse FP. Since 1 TS is comprised of 8 bits, a 3-bit TS counter 222 and a TS address counter 221 are used. The TS address counter 221 outputs a TS-address signal TSOA, which is supplied to the baud-rateselector unit 202 and the active-signal-selector unit 203. Further, the TS-address signal TSOA is supplied to an increment unit 227, where the address is incremented by 1. The reason to increment the address is that since path identifications are provided as time-slot addresses 1 through 32, the TS-address-signal TSOA ranging from 0 to 31 needs to be converted to count numbers ranging from 1 to 32. An output of the increment unit 227 is supplied to a D-FF (flip-flop) 225, which then outputs a TS-address signal TSA. The TS-address signal TSA is delayed by one clock cycle behind the TS-address signal TSOA.

An output of the 3-bit TS counter 222 is provided to a decoder 223. The decoder 223 changes an output signal cnt7 thereof to HIGH when the input thereto becomes 7. The signal cnt-7 and the frame pulse FP are supplied to a D-FF 226 via an OR circuit 224. In response, the D-FF 226 generates a TS-timing signal TSTIM which is a pulse signal indicating- a start of each terminal TS (time slot). The TS-timing signal TSTIM is supplied to the path-timing-signal-generation unit 204 and the active-TS-counter-control unit 205.

The baud-rate-selector unit 202 selects a baud rate with respect to each path based on the TSaddress signal TSOA. Path baud rates are given as baud-rate signals BR:30-1, and a baud rate of a selected path is output as a baud-rate signal BRS. Path 1 is selected when TSOA is equal to 0, and path 2 is selected when TSOA is equal to 1. The same applies in the case of path 3, path 4, and so on, with path 30 being selected when TSOA is equal to 29. When TSOA is either 30 or 31, the baud-rate signal BRS becomes zero. Namely, for example, path 1 is selected with respect to the first time slot, and path 2 is selected with respect to the second time slot.

The active-signal-selector unit 203 selects an active signal with respect to each path based on the TS-address signal TSOA. Active signals indicative of an active status of respective paths are given as active signals ACT:30-1, and an active signal of a selected path is output as an active signal ACTS. Path 1 is selected when TSOA is equal to 0, and path 2 is selected when TSOA is equal to 1. The same applies in the case of path 3, path 4, and so on, with path 30 being selected when TSOA is equal to 29. When TSOA is either 30 or 31, the active signal ACTS becomes zero. Namely, for example, path 1 is selected with respect to the first time slot, and path 2 is selected with respect to the second time slot.

The path-timing-signal-generation unit 204 generates a pulse signal indicating a start of a valid path by using mainly the baud-rate signal BRS and the TS-timing signal TSTIM. The path-timing-signal-generation unit 204 includes a decoder 231, an AND circuit 232, a zero-check circuit 233, an inverter circuit 234, an AND circuit 235, D-FFs 236, and D-FFs 237.

According to the present invention, path n is supposed to be output by starting at the n-th TS (time slot). With respect to the n-th TS, the baud rate of the path n is selected as the baud-rate signal BRS, so that a check can be made whether the path is valid or invalid based on whether the baud-rate signal BRS is zero. An output of the inverter circuit 234 becomes TRUE when a given path is valid (i.e., BRS is not zero). By performing an AND-logic operation between the output of the inverter circuit 234 and the TS-timing signal TSTIM, a path-timing signal PATHTIM is generated so as to indicate a start of a valid path.

Based on decoding results of the TS-address signal TSOA and the path-timing signal PATHTIM, the AND circuit 232 and the D-FFs 236 generate valid-path-start-indicator signals TIMPATH:30-1 indicating a start of a valid path with respect to each path.

The D-FFs 237 generates a signal PATHTIM2 which is delayed by 2 clock cycles behind the pathtiming signal PATHTIM.

Based on the active signal ACTS and the TS-timing signal TSTIM, the active-TS-counter-control unit 205 generates a load signal CNTLO and a count-enable signal CNTEN supplied to the active-TS-signalgeneration unit 206. The active-TS-counter-control unit 205 includes a zero-check circuit 241, a NOT circuit 242, and AND circuits 243 and 244. The load signal CNTLO is generated by the AND circuit 243 when both the active signal ACTS and the TS-timing signal TSTIM are both 1. That is, the load signal CNTLO becomes HIGH at a start of TS of an active path. The count-enable signal CNTEN is generated by the AND circuit 244 when the active signal ACTS is 0 and the TS-timing signal TSTIM is 1. That is, the count-enable signal CNTEN becomes HIGH at a start of TS of an inactive path.

The active-TS-signal-generation unit 206 includes a baud-rate counter 251 and a non-zero-check circuit 252. In the present invention, a baud rate and an active setting are provided with respect to each path. Basically, the system of the present invention is operable by solely depending on the baud rate settings. There is a need, however, to mask received data of paths which are set to be inactive. To this end, a signal indicating a active-TS period become necessary.

The baud-rate counter 251 loads the baud-rate signal BRS in response to the load signal CNTLO, and counts down a counter output in response to the count-enable signal CNTEN, thereby generating an active-TS signal TSACT. When the non-zero-check circuit 252 finds that the counter output is not zero, the active-TS signal TSACT becomes TRUE.

The signals generated by the configurations of FIG. 20A and FIG. 21 described above are used by the configuration of FIG. 20B to make a path selection.

The path selection is made with respect to each path at a timing indicated by the valid-path-start-indicator signals TIMPATH:30-1 when error signals regrading the #0 route or the #1 route are provided in synchronism with the received data. When either the #0 route or the #1 route suffers an error, a switch is made to the other route.

The route-determination/mask-signal-generation unit 211 is provided for each path, and generates a mask signal to mask received data when a route switch is made. Since two sets of identical data are input as received data with respect to the #0 route and the #1 route, some type of terminals may experience a hang-up when receiving the identical sets of data unless data masking is performed. The mask signal for preventing double reception of data is generated for a predetermined period of time counted by a built-in timer after detecting a switch of route-determination signals. The route-determination/mask-signal-generation unit 211 generates route-determination signals RUTE:30-1 for the 30 paths and mask signals MASK:30-1 also for the 30 paths. A configuration of the route-determination/mask-signal-generation unit 211 is the same as that of the prior art, and a description thereof will be omitted.

A parallel/serial-conversion unit 212 converts the route-determination signals RUTE:30-1 and the mask signals MASK:30-1 into serial signals which are in synchronism with the received data.

Figure 22:
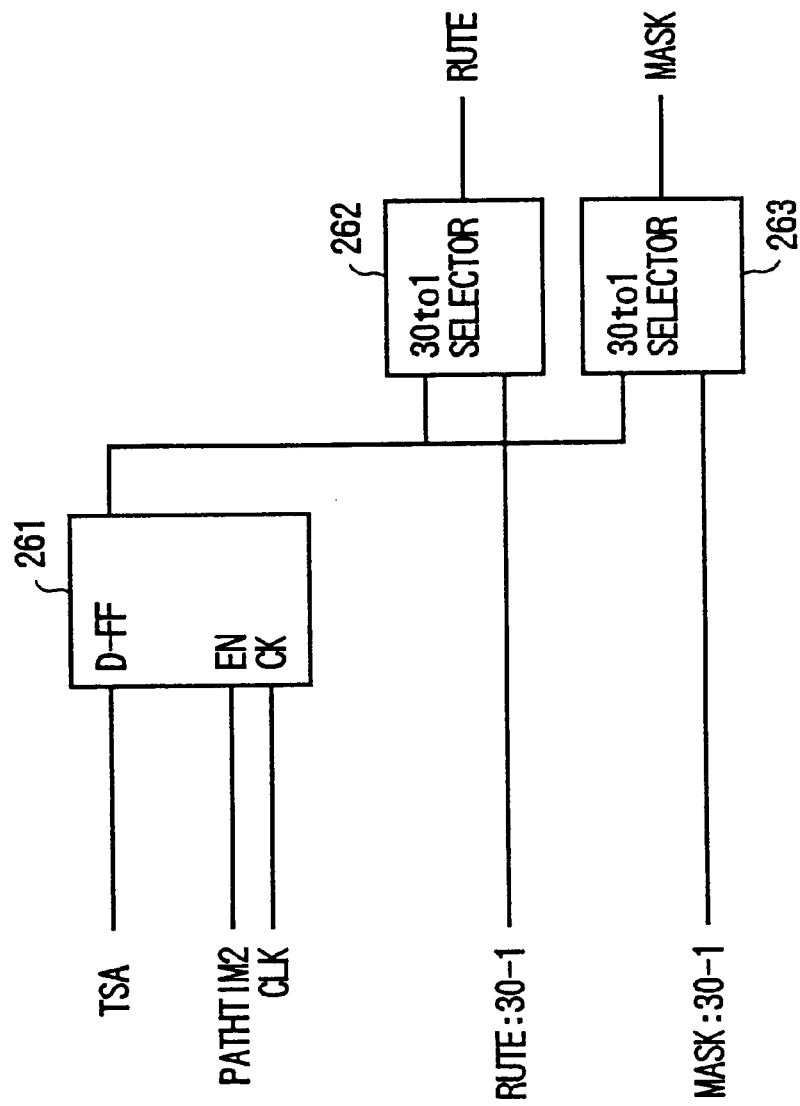
FIG. 22 is a block diagram of a parallel/serial-conversion unit.

FIG. 22 is a block diagram of the parallel/serial-conversion unit 212. The parallel/serial-conversion unit 212 of FIG. 22 includes a D-FF 261 and selectors 262 and 263. The selectors 262 and 263 select one signal from the 30 signals. The D-FF 261 latches the TS-address signal TSA in response to the signal PATHTIM2 indicating a start of each valid path, and supplies an output thereof to the selectors 262 and 263. The selectors 262 and 263 perform the parallel-to-serial conversion by successively selecting one of the route-determination signals RUTE:30-1 and one of the mask signals MASK:30-1, respectively, in response to the TS-address signal TSA latched by the DFF 261.

With reference to FIG. 20B again, a data-selection/mask-processing unit 213 attend to the selection and mask processing of the received data with respect to the #0 route and the #1 route. This is performed based on the route-determination signal RUTE and the mask signal MASK obtained after the parallel-to-serial conversion. Further, the dataselection/mask-processing unit 213 applies mask processing to the received data based on the active-TS signal TSACT. The data-selection/mask-processing unit 213 has the same configuration as that of the prior art, and a description thereof will be omitted.

FIGS. 23A through 23Y are timing charts showing route-selection operations performed by the configurations of FIGS. 20A and 20B. Functional ramifications and operations of signals shown in the timing charts should be found by referring to the previous descriptions. A case shown in FIGS. 23A through 23Y assumes that paths 1, 3, 5, and 7 have a baud rate of 2, and paths 1, 5, and 7 are active while path 3 is inactive. As shown in the figures, a path-wise selection can be made with regard to terminal outputs of the two routes.

In the following, a circuit configuration for performing the insertion/check of test patterns with respect to a particular path will be described according to the present invention.

As previously described, there is a need to perform the insertion/check of test patterns with respect to a particular path when data after the serial conversion is output from the P/S-conversion unit shown in FIG. 6.

Figure 24A:
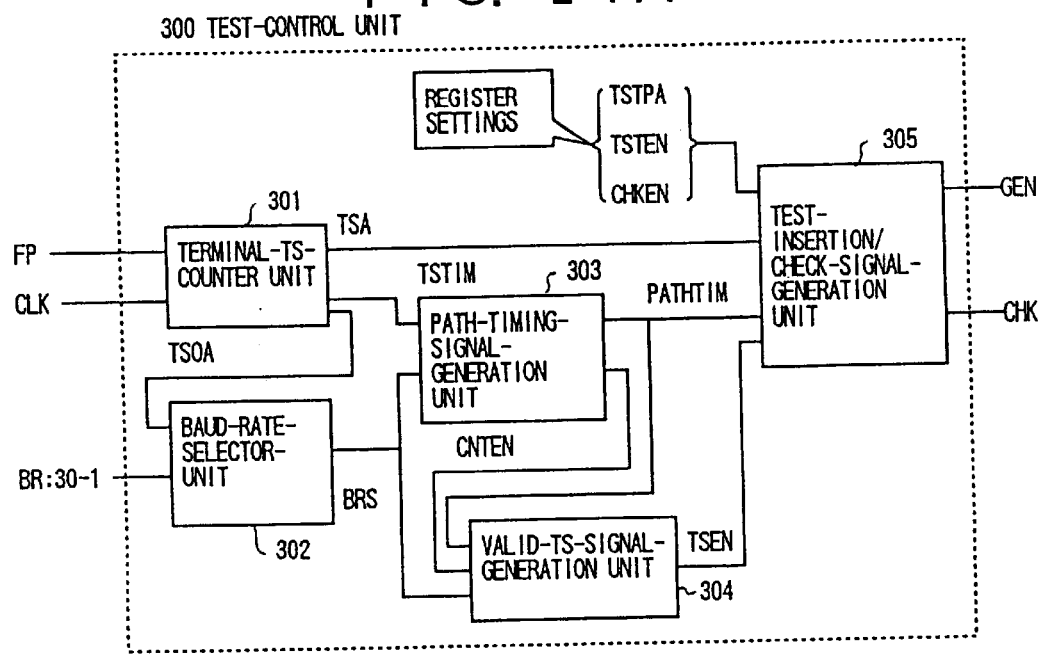
FIG. 24A is a block diagram of a test-control unit.
Figure 24B:
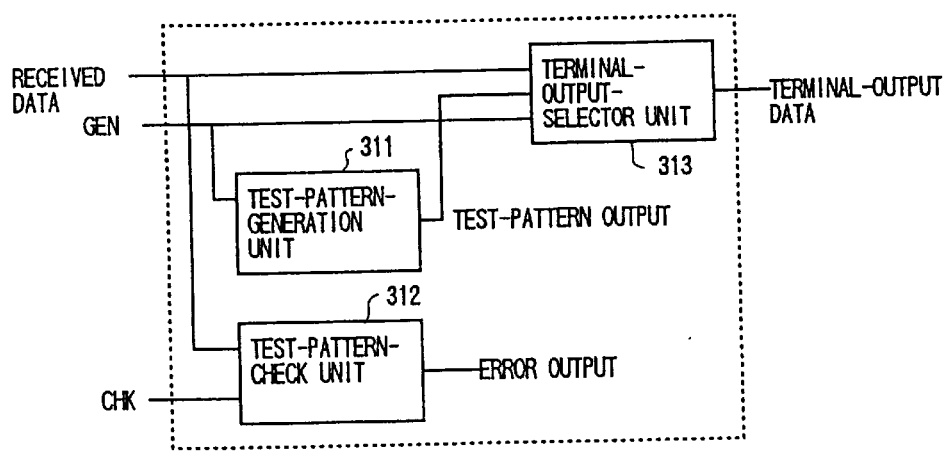
FIG. 24B is a block diagram of a configuration which performs insertion/check of test patterns based on timing signals generated by the test-control unit.

FIG. 24A is a block diagram of a test-control unit, and FIG. 24B is a block diagram of a configuration which performs the insertion/check of test patterns based on timing signals generated by the test-control unit.

The test-control unit 300 of FIG. 24A includes a terminal-TS-counter unit 301, a baud-rate-selector unit 302, a path-timing-signal-generation unit 303, a valid-TS-signal-generation unit 304, and a.testinsertion/check-signal-generation unit 305.

Figure 25:
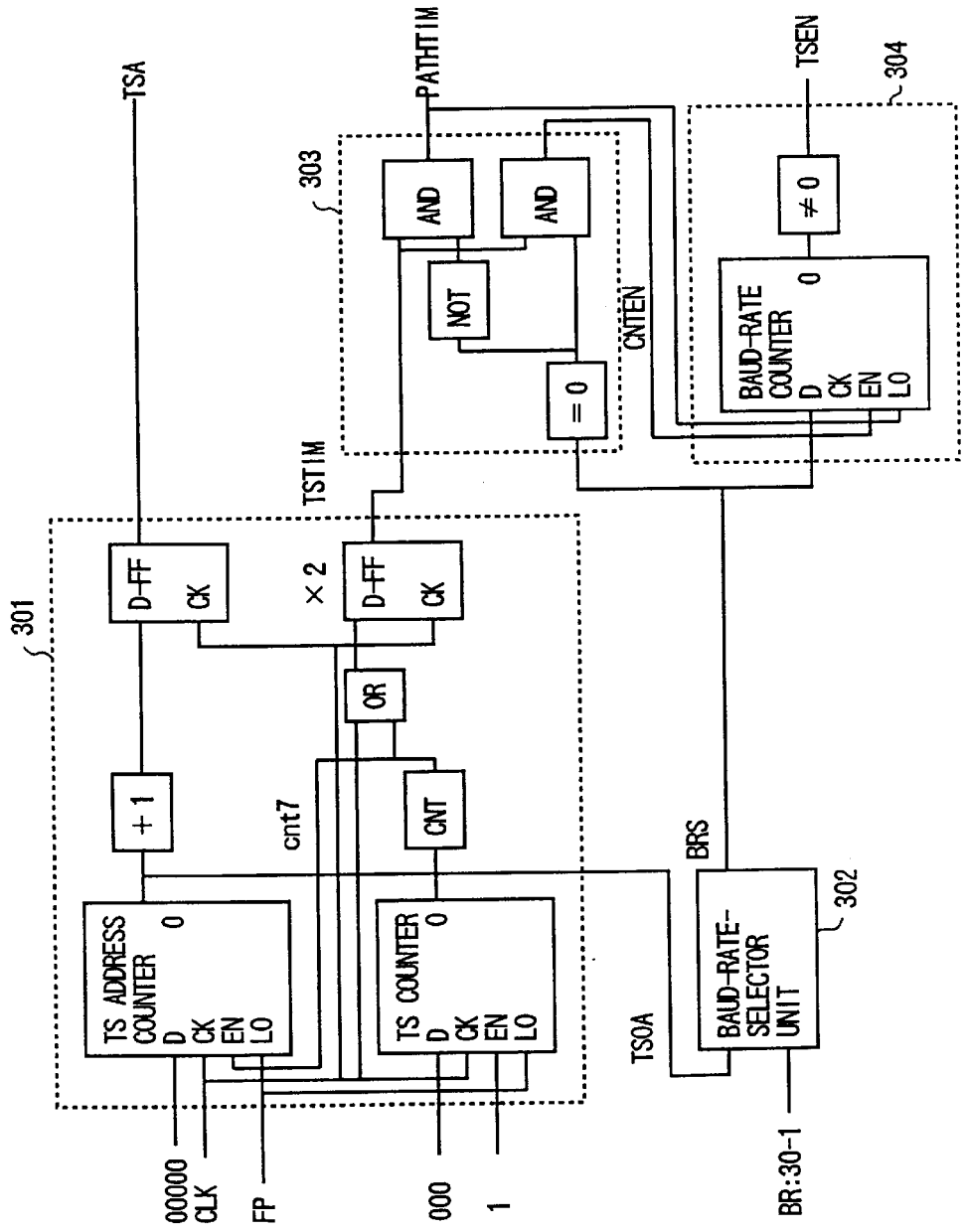
FIG. 25 is a circuit diagram showing detailed configurations of a terminal-TS-counter unit, a pathtiming-signal-generation unit, and a valid-TS-signal-generation unit of the test-control unit shown in FIG. 24A.

FIG. 25 is a circuit diagram showing detailed configurations of the terminal-TS-counter unit 301, the path-timing-signal-generation unit 303, and the valid-TS-signal-generation unit 304 of the test-control unit 300 shown in FIG. 24A. As is apparent from a comparison with the configuration of FIG. 21, the terminal-TS-counter unit 301, the path-timing-signal-generation unit 303, and the valid-TS-signal-generation unit 304 of FIG. 25 have the same configurations as those of the terminal-TS-counter unit 201, the active-TS-counter-control unit 205, and the active-TS-signal-generation unit 206 of FIG. 21, respectively, and a detailed description thereof will be omitted.

The active-TS-counter-control unit 205 of FIG. 21 generates the load signal CNTLO and the countenable signal CNTEN based on the active signal ACTS and the TS-timing signal TSTIM. In contrast, the pathtiming-signal-generation unit 303 of FIG. 25 generates the path-timing signal PATHTIM (identical to that of FIG. 21) indicating a start of each valid path and the count-enable signal CNTEN indicating a start of each invalid path. The generation of these signals is effected based on the baud-rate signal BRS and the TS-timing signal TSTIM.

Further, a valid-TS signal TSEN output from the valid-TS-signal-generation unit 304 is generated by loading the baud-rate signal BRS in response to the path-timing signal PATHTIM and counting down a counter output in response to the count-enable signal CNTEN. When the counter output is found to be non-zero, the valid-TS signal TSEN becomes TRUE. The valid-TS signal TSEN serves to indicate a valid-time-slot period.

Figure 26:
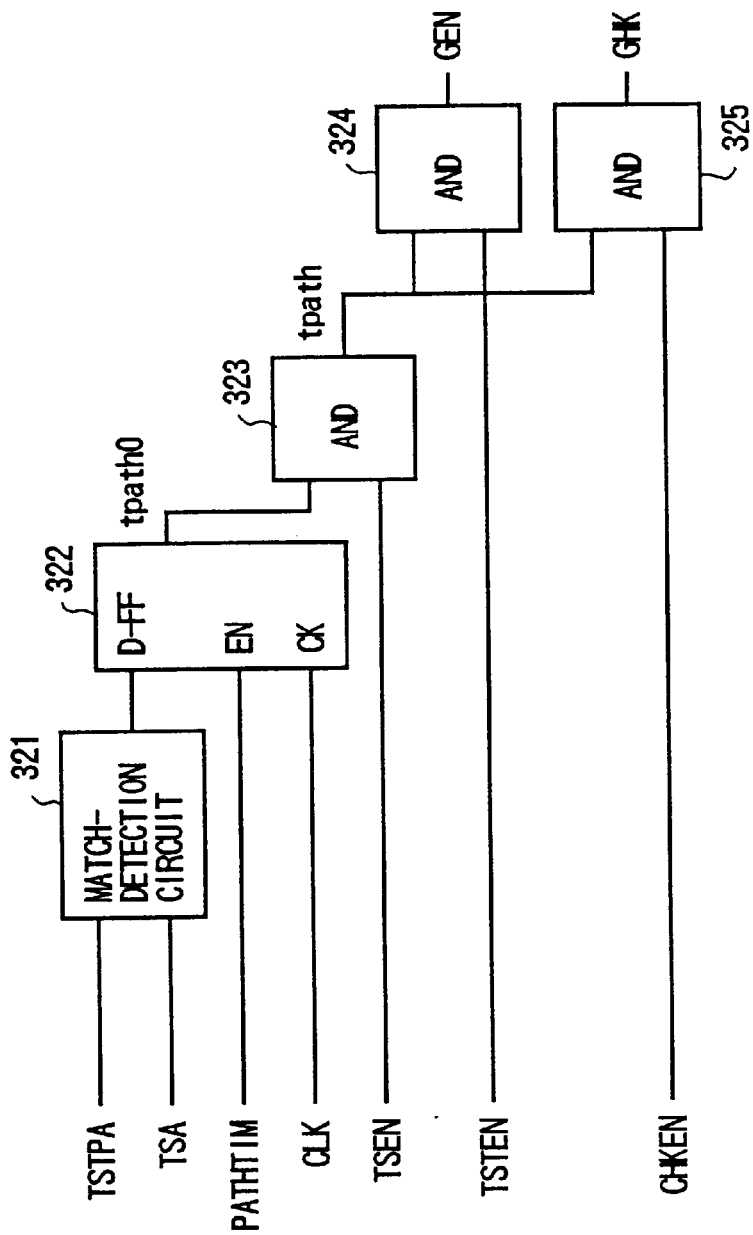
FIG. 26 is a circuit diagram of a test-insertion/check-signal-generation unit shown in FIG. 24A.

FIG. 26 is a circuit diagram of the test-insertion/check-signal-generation unit 305 shown in FIG. 24A.

The test-insertion/check-signal-generation unit 305 of FIG. 26 includes a match-detection circuit 321, D-FF 322, and AND circuits 323 through 325.

The test-insertion/check-signal-generation unit 305 receives test-set signals and timing-control signals, and generates test-pattern-insertion/check signals based on these received signals. The test-set signals are set by register values, and includes a test-path-indication signal TESTPA, a test-insertion signal TSTEN, and a check signal CHKEN. The timing-control signals includes the TS-address signal TSA from the terminal-TS-counter unit 301, the path-timing signal PATHTIM from the path-timing-signal-generation unit 303, and the valid-TS signal TSEN from the valid-TS-signal-generation unit 304. As previously described, the path-timing signal PATHTIM is a pulse signal indicating a start of each valid path.

The match-detection circuit 321 compares the test-path-indication signal TESTPA with the TS-address signal TSA, and changes an output thereof to HIGH as a match-detection result when a match is found. The match-detection result is latched by the D-FF 322 at a timing of the path-timing signal PATHTIM. The value latched by the D-FF 322 is output as a test-path-span signal tpathO. Unfortunately, there are cases in which an unused time slot(s) is present between a pulse of the path-timing signal PATHTIM indicative of a start of a valid path and a next pulse of the path-timing signal PATHTIM indicative of a start of a next valid path. To cope with such a circumstance, the AND circuit 323 performs an AND-logic operation between the test-path-span signal tpathO and the valid-TS signal TSEN, thereby generating a test-path-span signal tpath indicating a correct test-path period.

A test-pattern-generation signal GEN is generated by the AND circuit 324 performing an AND operation between the test-path-span signal tpath and the test-insertion signal TSTEN. Namely, the testpattern-generation signal GEN is generated to specify a test-path period only when the test insertion is indicated.

A test-pattern-check signal CHK is generated by the AND circuit 325 performing an AND operation between the test-path-span signal tpath and the check signal CHKEN. Namely, the test-pattern-check signal CHK is generated to specify a test-path period only when a check operation is indicated.

With reference to FIG. 24B again, the test-pattern-generation signal GEN is supplied to a testpattern-generation unit 311 and a terminal-output-selector unit 313. The test-pattern-check signal CHK is supplied to a test-pattern-check unit 312.

The test-pattern-generation unit 311 generate a test pattern in synchronism with the clock signal when the test-pattern-generation signal GEN is HIGH. The test-pattern-generation unit 311 has a configuration the same as that of the prior art, and a description thereof will be omitted.

The test-pattern-check unit 312 compares the received data with the test pattern in synchronism with the clock signal when the test-pattern-check signal CHK is HIGH, thereby checking errors. A configuration of the test-pattern-check unit 312 is the same as that of the prior art, and a description thereof will be omitted.

The terminal-output-selector unit 313 selects the test pattern provided from the test-pattern-generation unit 311 to output the same as terminal-output data when the test-pattern-generation signal GEN is HIGH. When the test-pattern-generation signal GEN is LOW, the received data is selected, and is output as the terminal-output data. The terminal-output-selector unit 313 has the same configuration as that of the prior art, and a description thereof will be omitted.

FIGS. 27A through 27Q are timing charts showing the test-insertion/check operations which are performed by the configurations of FIGS. 24A and 24B. The descriptions provided in the above should be referred to with regard to functional ramifications and behaviors of these signals shown in FIGS. 27A through 27Q. An example shown in the figures is a case in which paths 1 and 4 have baud rates 2 and 10, respectively, and other paths have a zero baud rate. In this example, the test-path setting is made to the path 1. As shown in FIGS. 27A through 27Q, the insertion/check of test patterns are carried out only with respect to a particular path.

In this manner, the present invention achieves the switching of routes with respect to each different path by using a relatively simple process and a relatively small circuit size. Further, the present invention achieves the insertion of a test pattern and/or the checking of errors with respect to a particular path by using a relatively simple process and a relatively small circuit size.

Further, the present invention is not limited to these embodiments, but various variations and modifications may be made without departing from the scope of the present invention.

What is claimed is:

1. A device outputting a plurality of paths to a terminal after rearranging the plurality of paths when the paths are arranged in an order of free choice, the device comprising:
   a counter which receives a path number of a path in response to first data about the path, and increments a count, starting from the path number, in response to additional data arriving; and
   a storage unit, on a side of a communication line, shared by the plurality of paths, which stores real data of the path at positions indicated by the count, wherein the real data stored in the storage unit is output to the terminal.

2. The device as claimed in claim 1, further comprising a data-enable circuit which holds a first value at positions therein indicated by the count when the real data is written at the positions indicated by the count in the storage unit, wherein the data-enable circuit holds a second value at all positions therein at an initial state with respect to each frame.

3. The device as claimed in claim 2, further comprising a circuit which masks said real data output to said terminal by using data held in said data-enable circuit.

4. The device as claimed in claim 1, further comprising a control-information-allocation circuit which receives control information allocated to the plurality of paths, and outputs the control information to the terminal synchronously with the real data output to the terminal.

5. The device as claimed in claim 4, wherein the control-information-allocation circuit comprises a plurality of selectors which are connected in series such that one of the selectors receives as one of its inputs thereof an output from a preceding one of the selectors.

6. The device as claimed in claim 5, wherein each of said plurality of selectors selects either said output from said preceding one of said selectors or said control information on a corresponding path, depending on whether a communication-data rate of said corresponding path is zero.

7. The device as claimed in claim 5, further comprising, a data-enable circuit which holds a first value at positions therein indicated by the count when said real data is written at the positions indicated by the count in the storage unit, wherein the data-enable circuit holds a second value at all positions therein at an initial state with respect to each frame.

8. The device as claimed in claim 7, further comprising a circuit which masks said control information output to said terminal by using data held in said data-enable circuit.

9. The device as claimed in claim 1, further comprising a frame buffer which holds said real data for at least one frame period.

10. The device as claimed in claim 9, further comprising a converting circuit which converts an output of said frame buffer from parallel data to serial data, said serial data being output to said terminal.

11. A device that outputs real data relating to a plurality of paths to a terminal at terminal-output data positions corresponding to a path number for each of the plurality of paths when receiving the plurality of paths arranged in an order of free choice, and that outputs multiplexed signaling information contained in the plurality of paths in a form of multi-frames to the terminal, the device comprising:
   a write-signal-generation circuit which generates write signals with respect to each path by detecting a synchronization of the multi-frames;

a rotation shifter which performs a rotation shift of a predetermined number of signaling signals contained in each frame of the multi-frames in accordance with the path numbers;

a write-signal-control circuit which selects at least one of the write signals in accordance with the path numbers; and a storage unit, on a side of a communication line, shared by the plurality of paths, which stores outputs from the rotation shifter at positions indicated by the write signals selected by the write-signal-control circuit.

12. The device as claimed in claim 11, wherein the write-signal-control circuit further comprises, a plurality of selectors connected in series such that at least one of the selectors receives as an input thereof an output from a preceding selector, each of the selectors having {(a corresponding path number −1)/(the predetermined number)+2} inputs.

13. The device as claimed in claim 12, wherein each of the selectors comprises at least one of a 2-input selector and a 3-input selector provided in a total number of {(the corresponding path number −1)/(the predetermined number)+1}.

14. The device as claimed in claim 12, wherein each of said selectors comprises 2input selectors provided in a total number of {(said corresponding path number −1)/(said predetermined number)+1}.

15. The device as claimed in claim 11, further comprising:
a register which sets mode information in each path, the mode information indicating one of a normal signaling mode and a multiplexed signaling mode; and
a selector, which receives the signaling signals corresponding to the multiplexed signaling mode as first inputs and the signaling signals contained in the attached information of the plurality of paths corresponding to the normal signaling mode as second inputs, and selects one of the first inputs and the second inputs based on the mode information set in the register.

16. The device as claimed in claim 15, further comprising signal-allocation circuit which receives said signaling signals contained in said attached information, and outputs said signaling signals contained in said attached information to said terminal in synchronism with said real data output to said terminal.

17. The device as claimed in claim 16, wherein said signal-allocation circuit comprises a plurality of selectors which are connected in series such that one of said selectors receives as one of inputs thereof an output from a preceding one of said selectors.

18. The device as claimed in claim 17, wherein each of said plurality of selectors selects either said output from said preceding one of said selectors or a signaling signal contained in said attached information of a corresponding path, depending on whether a communication-data rate of said corresponding path is zero.

19. The device as claimed in claim 15, comprising mode-information-allocation circuit which receives said mode information from said register, and outputs said mode information to said terminal in synchronism with said real data output to said terminal.

20. The device as claimed in claim 19, wherein said mode-information-allocation circuit comprises a plurality of selectors which are connected in series such that one of said selectors receives as one of inputs thereof an output from a preceding one of said selectors.

21. The device as claimed in claim 20, wherein each of said plurality of selectors selects either said output from said preceding one of said selectors or said mode information of a corresponding path, depending on whether a communication-data rate of said corresponding path is zero.

22. A device for outputting data relating to a plurality of paths to a terminal at terminal-output data positions corresponding to path numbers of the plurality of paths when receiving the plurality of paths arranged in an order of free choice, the plurality of paths having respective communication baud rates, the device comprising:
a timing-generation unit which generates a plurality of valid-path-start-indication signals, each signal indicating a start of a corresponding path if the corresponding path is a valid path;
a route-selection unit which selects one of a plurality of communication lines with respect to each different path by using timings indicated by the valid-path-start-indication signals and by referring to error signals of the two communication lines; and
a storage unit, on a side of a communication line, shared by the plurality of paths, which stores real data of the corresponding path, wherein each different path, when one of the plurality of communication lines suffer errors, switches to use another one of the plurality of communication lines.

23. The device as claimed in claim 22, wherein said timing-generation circuit further generates an active-time-slot signal indicating a span of each active path, said route-selection unit masking each inactive path.

24. The device as claimed in claim 22, wherein said route-selection unit masks said data upon detecting said line switch.

25. The device as claimed in claim 22, wherein said timing-generation unit comprises:
a terminal-time-slot-counter unit which generates a time-slot-address signal and a time-slot-timing signal, said time-slot-address signal indicating a position of each time slot, and said time-slot-timing signal indicating a start of each time slot; and
a path-timing-signal-generation unit which generates a path-timing signal in synchronism with said time-slot-timing signal based on whether a path selected by said time-slot-address signal has a zero baud rate, and generates said valid-path-start indication signals based on said path-timing signal and signals obtained by decoding said time-slot-address signal, said path-timing signal indicating a start of each valid path.

26. The device as claimed in claim 25, said timing-generation unit comprises:
a terminal-time-slot-counter unit which generates a time-slot-address signal and a time-slot-timing signal, said time-slot-address signal indicating a position of each time slot, and said time-slot-timing signal indicating a start of each time slot; and
a path-timing-signal-generation unit which loads a baud rate of a given path in synchronism with said time-slot-timing signal when an active signal corresponding to said given path and selected by said time-slot-address signal is 1, and counts down a count once in every time slot when said active signal is zero, thereby generating an active-time-slot signal based on whether said count is zero.

27. A device for outputting data relating to a plurality of paths to a terminal at a plurality of terminal-output data positions corresponding to path numbers relating to the plurality of paths when receiving the paths arranged in an order of free choice, the plurality of paths having respective communication baud rates, the device comprising:

a test-control unit which generates a valid-time-slot signal indicative of a time-slot period of each valid path based on a path-timing signal indicating a start of each valid path, and generates a test-path-span signal based on the valid-time-slot signal and a test-path-indication signal that indicates a path into which a test pattern is inserted, the test-path-span signal indicating a period of the path into which the test pattern is inserted;

a storage unit, on a side of a communication line, shared by the plurality of paths, which stores real data of each valid path; and an insertion unit which inserts the test pattern into a particularly indicated path based on the test-path-span signal.

28. The device as claimed in claim 27, wherein said insertion unit performs an error check on a particularly indicated path based on said test-path-span signal.

29. The device as claimed in claim 27, wherein said test-control unit comprises:

a terminal-time-slot-counter unit which generates a time-slot-address signal and a time-slot-timing signal, said time-slot-address signal indicating a position of each time slot, and said time-slot-timing signal indicating a start of each time slot;

a path-timing-signal-generation unit which generates said path-timing signal in synchronism with said time-slot-timing signal based on whether a path selected by said time-slot-address signal has a zero baud rate;

a valid-time-slot-signal-generation unit which loads a baud rate of a given path in synchronism with said time-slot-timing signal when a baud rate selected by said time-slot-address signal is not zero, and counts down a count once in every time slot when said baud rate is zero, thereby generating said valid-time-slot signal based on whether said count is zero; and a test-insertion/check signal which latches a signal as a latched signal at timings indicated by said path-timing signal, said signal having a true value when said time-slot-address signal matches said test-path-indication signal, and generates said test-path-span signal by obtaining a logic product between said latched signal and said valid-time-slot signal.

* * * * *